United States Patent
Wallner et al.

(10) Patent No.: US 9,617,018 B2
(45) Date of Patent: Apr. 11, 2017

(54) AUTOMATED DETECTION AND CHARACTERIZATION OF EARTH-ORBITING SATELLITE MANEUVERS

(71) Applicant: Rincon Research Corporation, Tucson, AZ (US)

(72) Inventors: Michele Kubis Wallner, Parker, CO (US); Richard Nicholas Wallner, Parker, CO (US); Douglas Edward Cather, Monument, CO (US)

(73) Assignee: Rincon Research Corporation, Tucson, AZ (US)

( * ) Notice: Subject to any disclaimer, the term of this patent is extended or adjusted under 35 U.S.C. 154(b) by 151 days.

(21) Appl. No.: 14/611,201

(22) Filed: Jan. 31, 2015

(65) Prior Publication Data

US 2015/0274328 A1      Oct. 1, 2015

Related U.S. Application Data

(60) Provisional application No. 61/971,970, filed on Mar. 28, 2014.

(51) Int. Cl.
*B64G 3/00* (2006.01)
*G01C 21/24* (2006.01)
*B64G 1/24* (2006.01)

(52) U.S. Cl.
CPC ............... *B64G 3/00* (2013.01); *B64G 1/242* (2013.01); *G01C 21/24* (2013.01)

(58) Field of Classification Search
None
See application file for complete search history.

(56) References Cited

U.S. PATENT DOCUMENTS 6,708,116 B2    3/2004  Wright
8,386,099 B2    2/2013  Carrico, Jr. et al.
(Continued)

OTHER PUBLICATIONS

Wikipedia Article "Robust Statistics" available at https://en.wikipedia.org/wiki/Robust_statistics Published on or before Jan. 9, 2012.*

(Continued)

*Primary Examiner* — Todd Melton
*Assistant Examiner* — Jason Roberson
(74) *Attorney, Agent, or Firm* — Eric A. Gifford

(57) ABSTRACT

The process validates measurement data that are consistent with the current orbit or allowable maneuvers for Earth-orbiting satellites. The validated data may be processed to detect both large and small maneuvers; large maneuvers that may have been rejected by standard data validation process and small maneuvers that may have been missed. Large maneuvers may present as "trends" in the residuals above the noise threshold from multiple sensors. Small maneuvers may present as a deviation from the expected orbit. The OD engine is suitably configured (as per normal operation) to enforce data reduction on any outliers (e.g. >3 sigma). The maneuver estimation routines employ an objective function for selection of maneuver estimates that combines a residual fit to the current orbit and maneuver, orbit consistency and a penalty for validated but unused data (data that is rejected by the OD engine). The combination of enforcing data reduction in the OD engine of validated data while penalizing that reduction biases the estimation routines to select maneuver estimates that fit all or substantially all of the validated data. The maneuver estimation routines also suitably use a center time & duration window to select the maneuver estimate and iterate the process as new measurement data is received to refine the maneuver estimate.

21 Claims, 18 Drawing Sheets

(56) References Cited

U.S. PATENT DOCUMENTS

| | | | | |
|---|---|---|---|---|
| 8,600,676 | B2 | 12/2013 | Hwang et al. | |
| 2003/0096609 | A1* | 5/2003 | Wright | B64G 1/242 |
| | | | | 455/427 |
| 2011/0196550 | A1* | 8/2011 | Carrico, Jr. | B64G 3/00 |
| | | | | 701/13 |
| 2012/0046863 | A1* | 2/2012 | Hope | B64G 3/00 |
| | | | | 701/531 |
| 2012/0176271 | A1* | 7/2012 | Dai | G01S 19/04 |
| | | | | 342/357.44 |

OTHER PUBLICATIONS

Aaron. Benjamin S. "Geosynchronous Satellite Maneuver Detection and Orbit Recovery Using Ground Based Optical Tracking," submitted to the Department of Aerospace Engineering, Massachusetts Institute of Technology, Jun. 2006.

Huang et al., "An object correlation and maneuver detection approach for space surveilannce," Research in Astron. Astrophys. 2012 vol. 12 No. 10, pp. 1402-1416.

Folcik et al., "Geo Maneuver Detection for Space Situational Awareness," AAS Paper 07-285, Reprinted from vol. 129 of the Advances in the Astronautical Sciences series, 2008, pp. 523-549.

Holzinger et al., "Object Correlation and Maneuver Detection Using Optimal Control Performance Metrics," 2010 Advanced Maui Optical and Space Surveillance Technologies Conference, Sep. 14-17 Maui, HI.

Hujsak, Richard S., "Orbit Determination During High Thrust and Low Thrust Maneuvers," 15th AAS/AIAA Space Flight Mechanics Conference, Copper Mountain, CO, Jan. 23-27, 2005.

Kelecy et al., "Detection and orbit determination of a satellite executing low thrust maneuvers," Acta Astronautics 66 (2010), pp. 798-809.

Patera, Russell P., "Space Event Detection Method," Journal of Spacecraft and Rockets, vol. 45, No. 3 May-Jun. 2008.

Storch, Tara R., "Maneuver Estimation Model for Relative Orbit Determination," Air Force Institute of Technology, Wright-Patterson Air Force Base, Ohio, Mar. 2005.

Johnson, Thomas M., "TDRS-3 Orbit Determination Across Unknown Maneuvers," European Space Astronomy Centre (ESA/ESAC) Madrid, Spain, May 3-6, 2010.

Wu et al., Algorithms for Detecting Orbit Maneuver in Artificial Satellites, Chinese Astronomy and Astrophysics 26 (2002), pp. 228-234.

Gienger et al., "Towards Automated Determination of Orbit Maneuvers for GNSS Satellites," Advances in the Astronautical Sciences 145 (2012): pp. 131-150.

Woodburn et al., "Estimation of Instantaneous Maneuvers Using a Fixed Interval Smoother," Advances in the Astronautical Sciences 116 (2003): pp. 243-260.

Montenbruck et al., "Satellite Orbits," Springer, Corrected 2nd Printing 2001, pp. 193-288.

Tapley et al.,"Statistical Orbit Determination," Elsevier, Copyright 2004., pp. 93-148 and 159-264.

\* cited by examiner

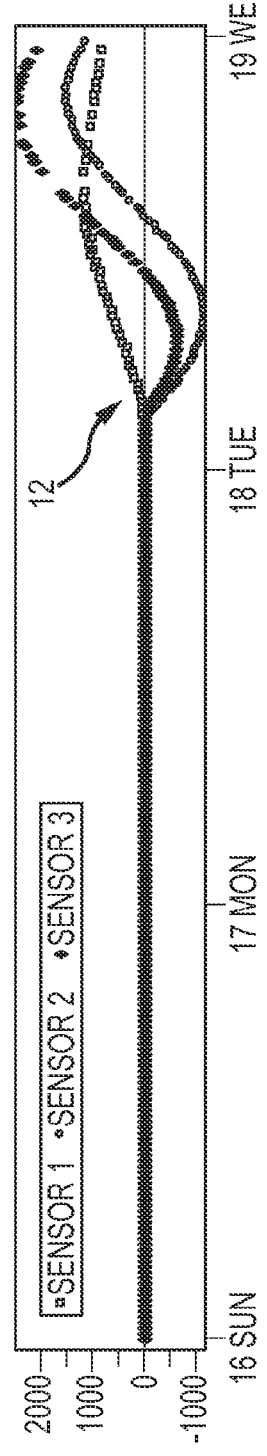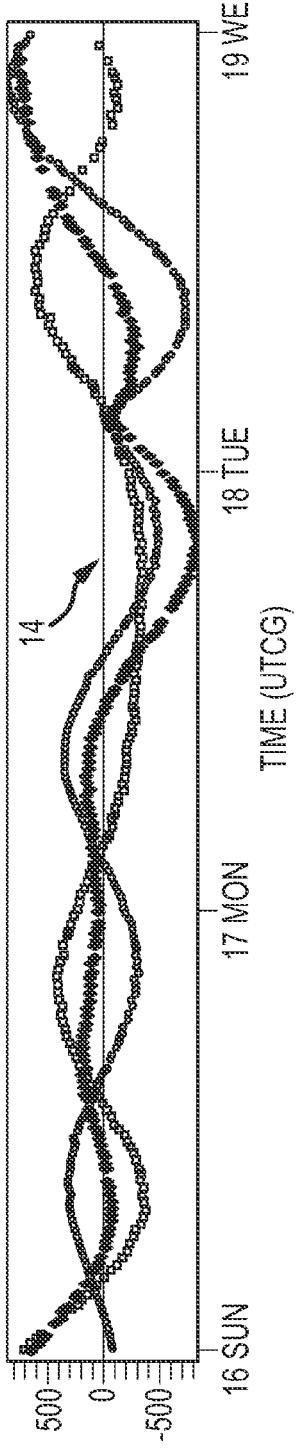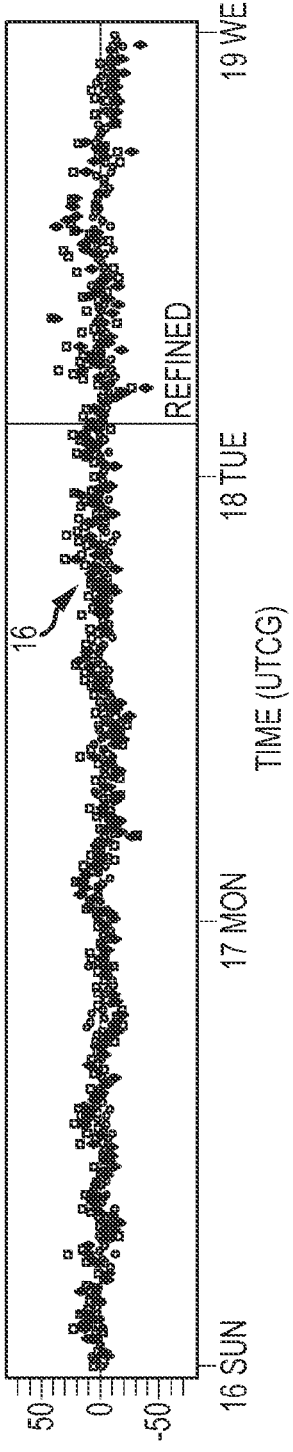
FIG. 2A PRIOR ART
FIG. 2B PRIOR ART
FIG. 2C PRIOR ART

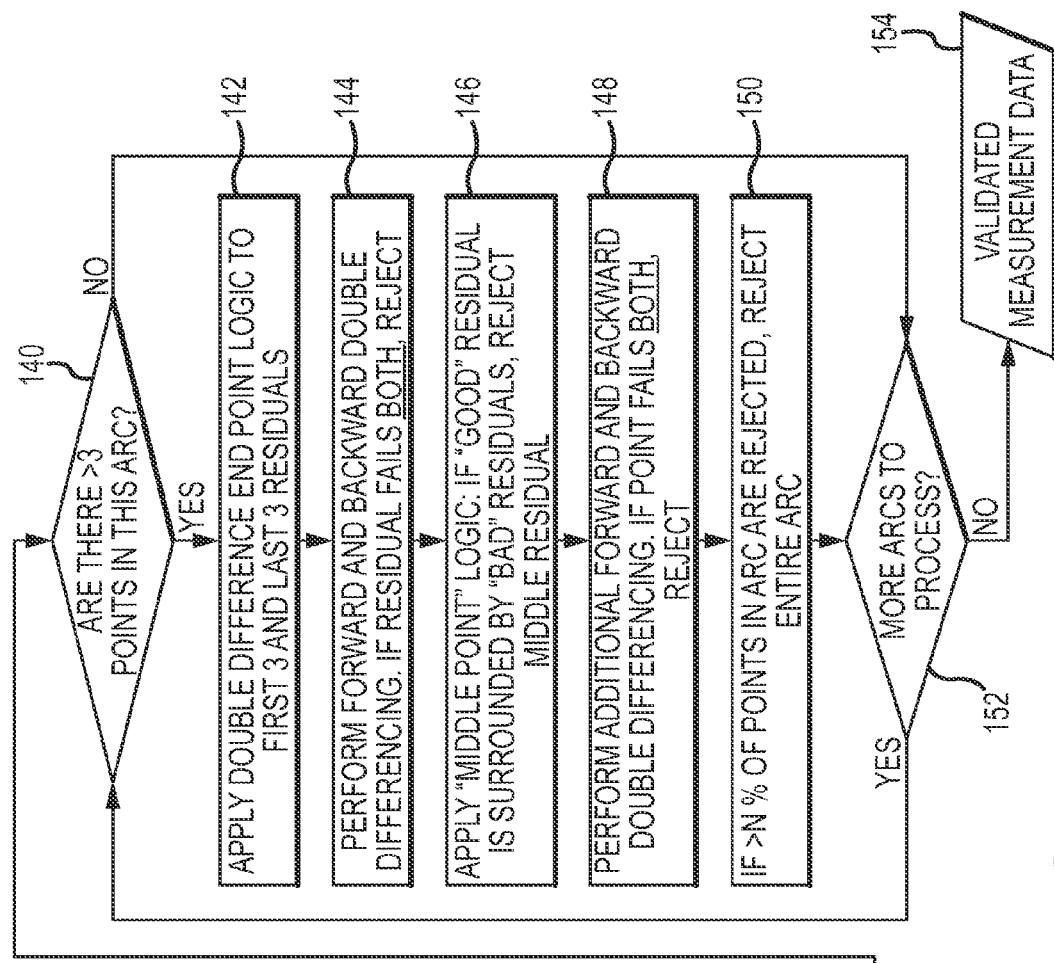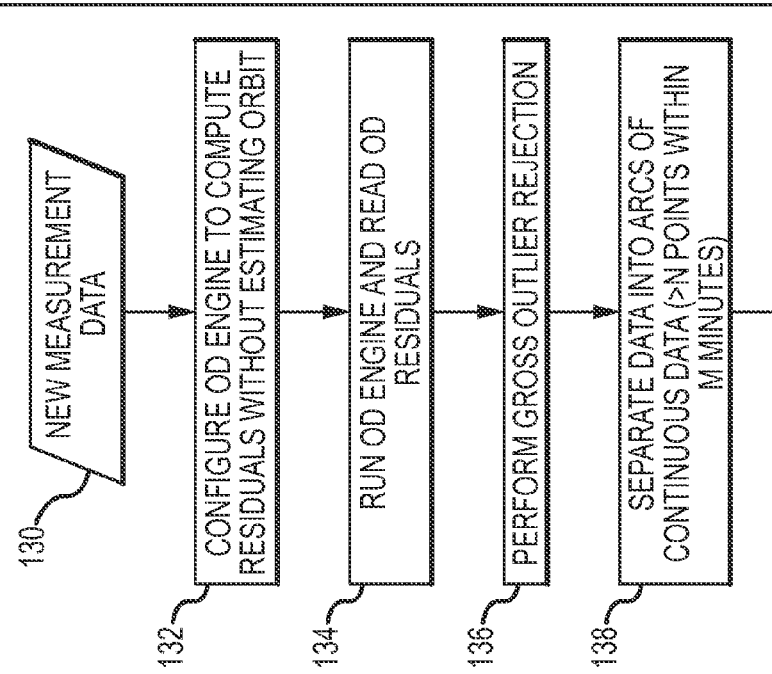
FIG. 7

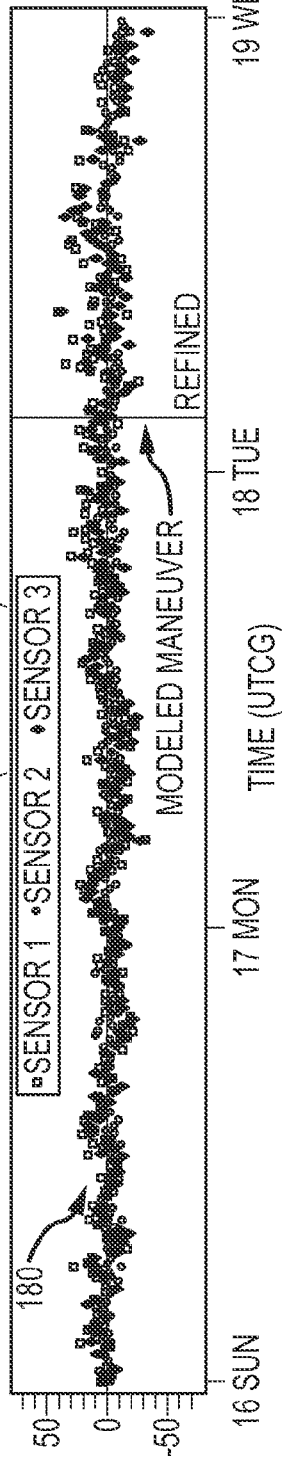
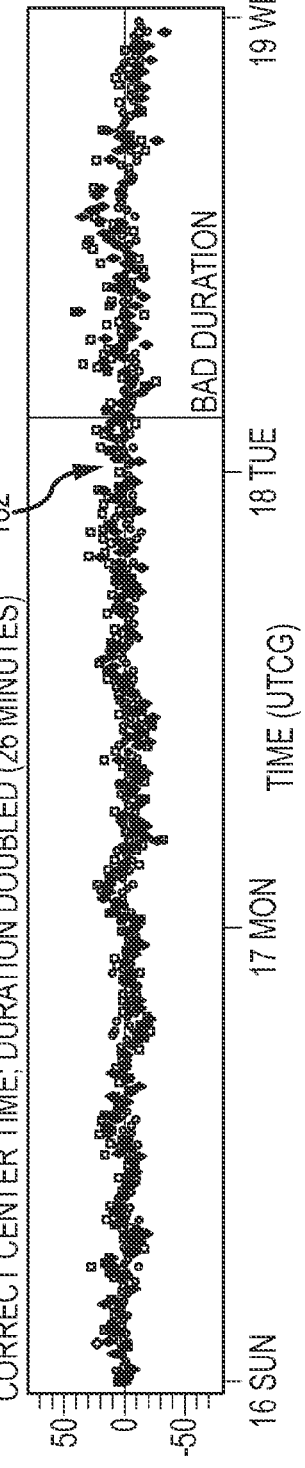
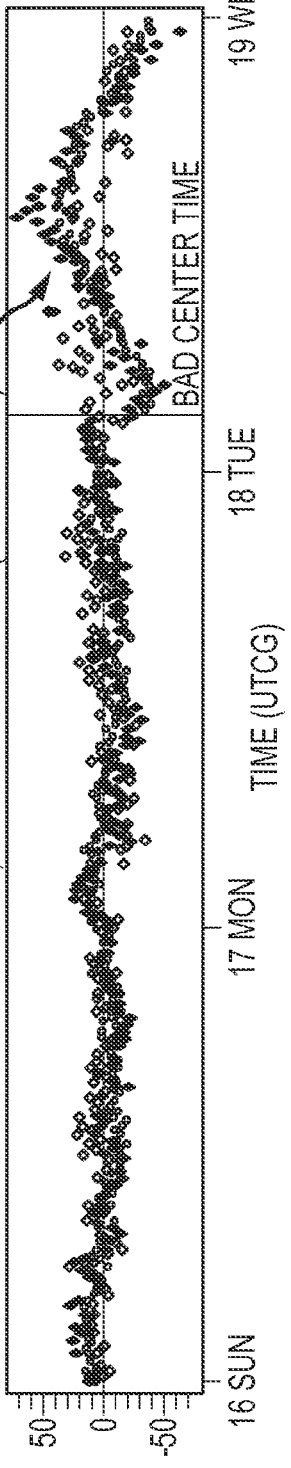

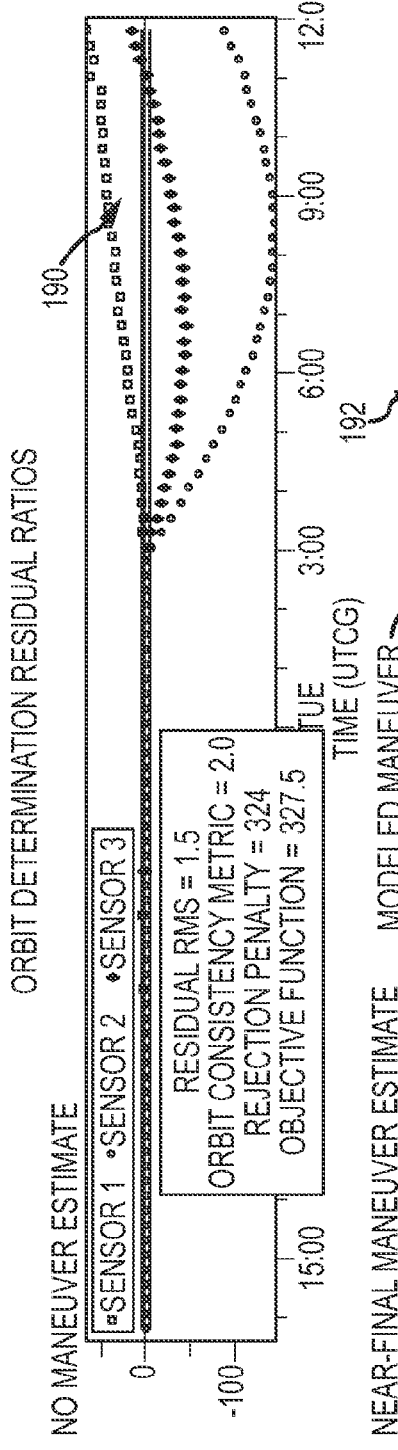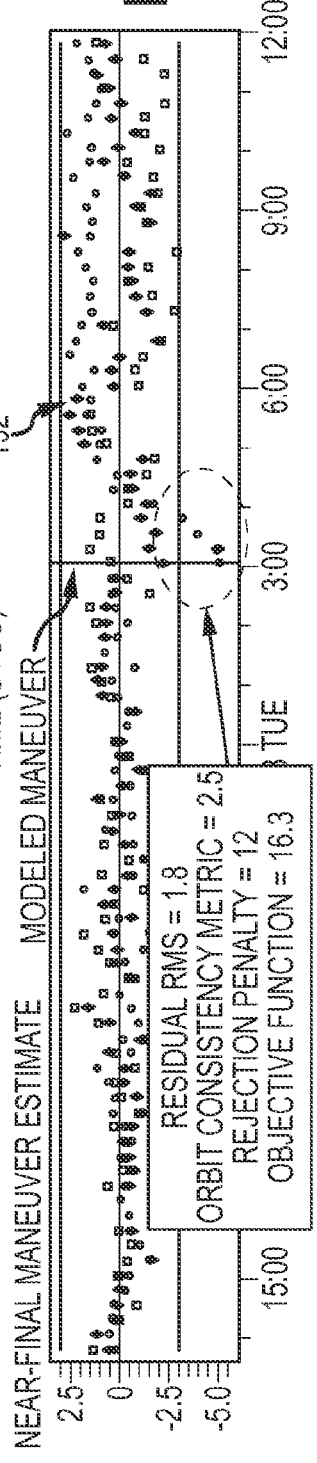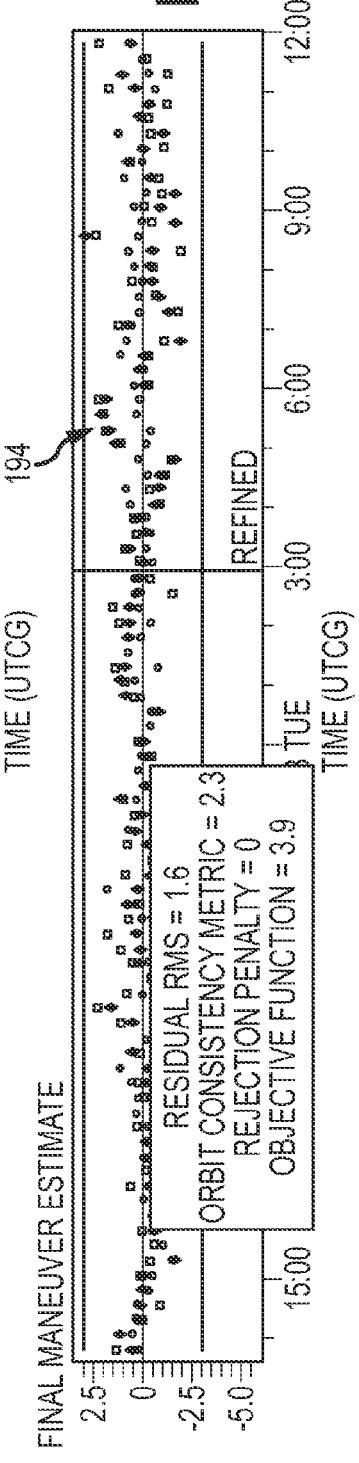

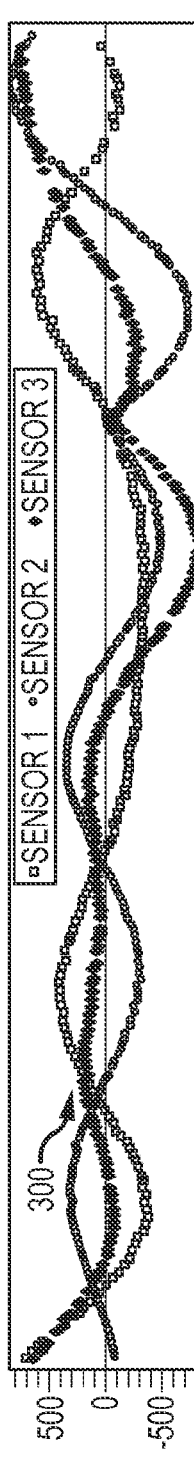
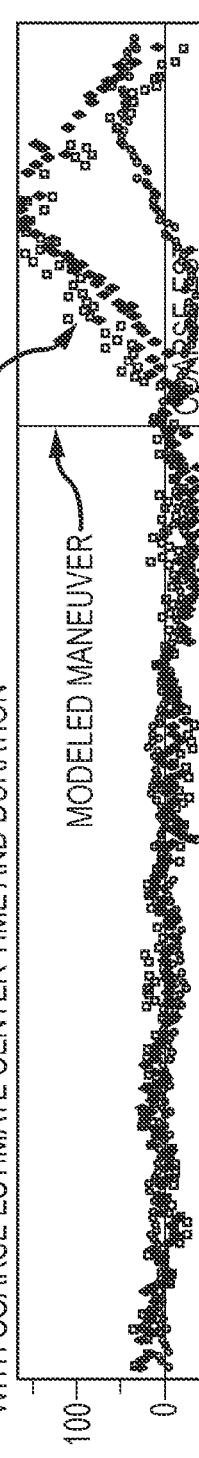
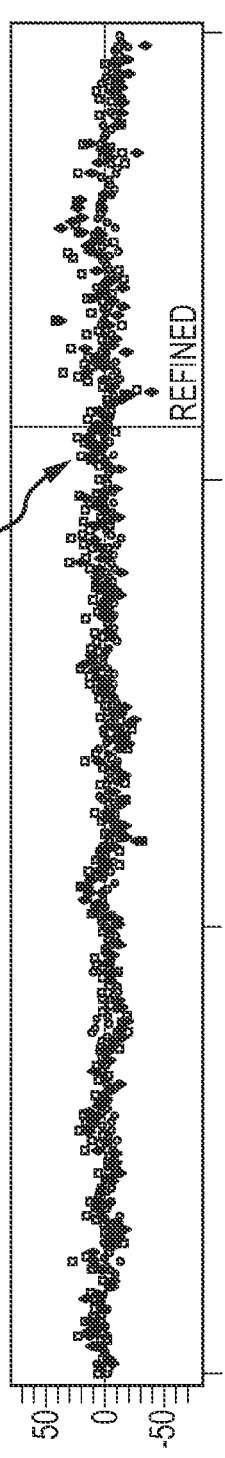
FIG. 13A — Orbit Determination Residuals with no maneuver modeling
FIG. 13B — With coarse estimate center time and duration
FIG. 13C — Fully refined center time and duration

AUTOMATED DETECTION AND CHARACTERIZATION OF EARTH-ORBITING SATELLITE MANEUVERS

CROSS-REFERENCE TO RELATED APPLICATIONS

This application claims benefit of priority under 35 U.S.C. 119(e) to U.S. Provisional Application No. 61/971,970 entitled "Automated Detection and Characterization of Earth-Orbiting Satellite Maneuvers" and filed on Mar. 28, 2014, the entire contents of which are incorporated by reference.

BACKGROUND OF THE INVENTION

Field of the Invention

This invention relates to orbit determination of Earth-orbiting satellites and more specifically to the detection and characterization of maneuvers of Earth-orbiting satellites.

Description of the Related Art

Satellites orbiting the Earth are acted upon by many different forces, some of which are hard to accurately characterize and predict. These perturbative forces add significant inaccuracy to predictions of where the satellite will be in the future. For this reason, routine measurements of the satellite's position and velocity are taken, and these measurements are used to update the satellite's estimated orbit. This process of orbit determination is repeated periodically to continue to update the estimate of the satellite's trajectory.

In addition, the perturbative forces acting on satellites cause them to drift from their intended orbits. To restore the satellite to its intended orbit or to move the satellite into a new orbit, operators fire thrusters to maneuver the satellite. Several different kinds of thrusters can be used to maneuver satellites; higher-thrust thrusters such as chemical thrusters are fired for short periods of time (seconds to minutes) to perform a maneuver, and lower-thrust thrusters such as electric/ion thrusters are fired for longer periods of time (tens of minutes to hours) to perform the same size maneuver.

When performing orbit determination on a satellite which maneuvers, accurate modeling of the thrusting force is critical to accurate orbit determination results, and is therefore important to the ability to predict the future position of the satellite.

The process by which measurements of a satellite's position & velocity are used to update the estimated orbit is known as orbit determination (OD). Many types of measurements can be used for orbit determination, for example, range, Doppler, and azimuth and elevation angles can be measured by radars or communication systems; and optical telescopes can measure Right Ascension and Declination angles by comparing the satellite's position against the star background. See Montenbruck, O., and Gill, E. (2001). *Satellite Orbits: Models, Methods, and Applications*. New York: Springer. pp. 193-288 and Tapley, B. D., Schutz, B. E., and Born, G. H. (2004). *Statistical Orbit Determination*. San Francisco: Elsevier Academic Press. pp. 93-148 and 159-264.

Standard OD processes use statistical estimation techniques; most often, either a Batch Weighted Least Squares (BWLS) or an Extended Kalman Filter (EKF) is used. Both the BWLS and EKF methods for orbit determination are well known and established. See Montenbruck, O., pp. 257-288 and Tapley, B. pp. 159-263.

Both the BWLS and EKF processes work by computing the predicted position and velocity of the satellite at the time of each measurement, computing the difference between the predicted position/velocity and the measured data—a quantity known as the measurement residual—and using the estimation technique to calculate an updated satellite trajectory which best fits the measurements used. The two major techniques differ primarily in that a BWLS process computes the residuals of a "batch" of measurements and combines all the information to compute an updated orbit, whereas an EKF sequentially processes each measurement and computes an updated orbit at each measurement. FIG. 1 shows an illustration of the residuals 10 for a good orbit determination on a satellite tracked by 3 sensors. A "perfect" orbit determination would fit all the measurements exactly, making the residuals all zero. Due to noise and other errors on the measurements, as well as imperfect modeling of the forces acting on the satellite, residuals are always non-zero. A good orbit determination will reduce the residuals to just noise, or nearly just noise, as shown in the figure.

Both BWLS and EKF-based orbit determination processes also produce statistical estimates of the error in the orbit solution—this data is represented by the covariance. All OD processes produce a covariance matrix as part of the estimation computations, but each OD process may add custom "process noise" factors to the covariance to better represent the true orbit error.

FIGS. 2A-2C illustrate the importance of correctly modeling maneuver effects when performing orbit determination. FIG. 2A shows the residuals 12 from 3 sensors for a good pre-maneuver OD run with small residuals from February $16^{th}$-$18^{th}$, and shows the effects of a maneuver early on February $18^{th}$ on the measurement residuals. FIG. 2B shows the residuals 14 for an OD run which includes the post-maneuver measurements but does not model the effects of the maneuver—fit quality here is clearly poor. FIG. 2C shows the OD residuals 16 if the maneuver is correctly modeled—measurement data before and after the maneuver fits well.

Maneuver detection and characterization techniques fall into three general types:

a) Once measurement data no longer fits the old orbit, use a simple manual or automated iteration to try to isolate approximately when the maneuver occurred, and then start an entirely new orbit determination using only post-maneuver data.

b) Once measurement data no longer fits the old orbit, add process noise to the orbit determination process to increase the size of the covariance and allow the measurement data to be used.

c) Once measurement data no longer fits the old orbit, assume the maneuver is in the "in-track" direction (the direction of satellite motion), and use the initial post-maneuver measurement data to solve for a change in orbit energy or equivalently, semi-major axis.

These known maneuver detection and characterization techniques are generally incapable of fitting the measurement data before, during and after the maneuver.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention relates to the identification and characterization of Earth-orbiting satellite maneuvers.

In different embodiments, the invention is a series of processes that work with existing orbit determination systems (herein referred to as the "OD Engine"), and augment those systems to detect and characterize maneuvers. Trackers provide measurement data on the satellite, and provide it to a computer running Orbit Determination software and the Maneuver Detection and Characterization software, and orbit and maneuver parameters are computed.

A typical OD process uses a "sliding window" of data (either explicitly in a BWLS, or by use of a "forgetting factor" in an EKF) by periodically taking in new measurement data, and running the OD Engine to calculate an updated orbit, and then waiting for more measurement data before starting again.

In an embodiment, the invention adds a "wrapper" around the OD Engine, which validates the measurement data before the OD Engine is run, and then takes the results from the OD Engine, and if the process was not already in maneuver recovery mode, evaluates the OD results to determine if a maneuver has occurred. If no maneuver was detected, the process completes, like the standard OD process. If a maneuver is detected, the process applies a series of procedures to compute the estimated time, direction, and magnitude of the maneuver, providing that information to the OD Engine, running the OD Engine, and evaluating the results.

This process is not tied to a particular OD Engine, nor it is tied to particular measurement types—it is a process that can be used to enhance any orbit determination system to enable it to detect and characterize satellite maneuvers. If an EKF-based OD Engine is used, this process runs the EKF in a batch-like mode, re-processing the pre-maneuver data along with the post-maneuver data in order to get a good maneuver solution.

In different embodiments, the invention may implement one or more of the following concepts in various combinations to provide for the identification and characterization of Earth-orbiting satellite maneuvers.

The process needs to effectively identify and remove bad measurement data, but not data that could represent the effects of a maneuver, to ensure that maneuvers are correctly identified, and to prevent outlier data from corrupting the maneuver solution. In an embodiment, a data validation routine pre-processes the measurement data before the data is used by the OD Engine, using a physics-based method that can distinguish bad measurement data from measurement data that could represent a satellite maneuver large or small.

Once bad measurement data has been removed, the OD Engine needs to use as much of the remaining measurement data as possible to correctly solve for the maneuver. In different embodiments, the various maneuver estimation routines require the OD Engine to reject bad measurements using its normal methodology, but define an objective function that penalizes the OD Engine for rejecting measurement data. This biases the process to identify a maneuver that most accurately models all of the validated data.

In embodiments of the maneuver estimation processes, solving for maneuver center time and duration has been demonstrated to be more effective and stable than solving for maneuver start time and stop time, even though both sets of parameters are mathematically equivalent. The reason for this is that the maneuver duration can be traded off with the maneuver thrust level, and still result in the same overall maneuver size $$\left(\Delta Velocity = \frac{Thrust \cdot Duration}{Mass}\right).$$

De-coupling the "time" of the maneuver from the duration allows the process to solve for maneuver "time" independently of the duration/thrust level, and results in a more stable and accurate solution.

In different embodiments, a multi-step, iterative process, which is repeated as new post-maneuver measurement data is received, is employed. This process first iterates to find a coarse maneuver estimate involving a few key maneuver parameters, and then iterates again to refine the maneuver estimate for all maneuver parameters, and the overall process is repeated as more post-maneuver measurements are received.

The benefits of this maneuver detection and characterization process may include: 1) a higher percentage of maneuvers accurately detected and characterized; 2) improved characterization of maneuver parameters (direction, duration, thrust level) that are repeatable across many maneuvers; and 3) smaller orbital position and velocity error after maneuvers.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 2A-2C, as described above, are plots of measurement residuals versus time depicting the effects of a maneuver for a pre-maneuver orbit, orbit determination with no maneuver modeling and orbit determination with correct maneuver modeling;

FIG. 7 is a flow diagram of an embodiment of a data validation routine that implements a double-differencing process;

FIGS. 9A-9C are plots of measurement residuals versus time with correct center time and duration for an estimated maneuver, correct time but doubled duration and a center time with a small error and correct duration;

FIGS. 10A-10C are plots of measurement residuals versus time for no maneuver estimate, a near-final maneuver estimate and a final maneuver estimate using an objective function that combines fit quality, orbit consistency and a penalty for validated but unused data;

FIGS. 13A-13C are plots of measurement residuals versus time with no maneuver modeling, a coarse maneuver estimate and a fully refined maneuver estimate;

DETAILED DESCRIPTION OF THE INVENTION

The present invention relates to the identification and characterization of Earth-orbiting satellite maneuvers. In different embodiments, the invention is a series of processes which work with existing orbit determination systems (herein referred to as the "OD Engine"), and augment those systems to detect and characterize maneuvers. In an embodiment, the invention adds a "wrapper" around the OD Engine to validate data, detect maneuvers, and provide an estimate of the detected maneuvers.

Figure 1:
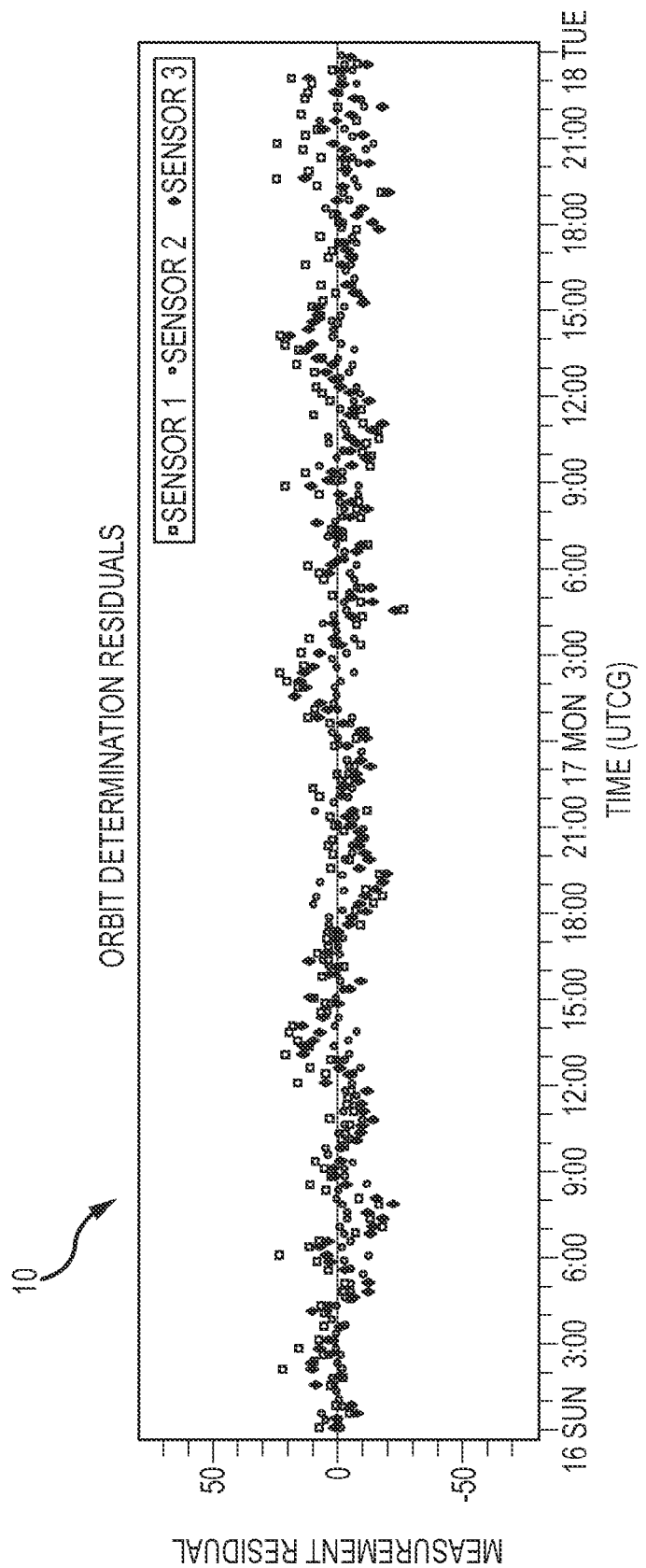
FIG. 1, as described above, is a plot of measurement residuals versus time for a non-maneuvering satellite.
Figure 3A:
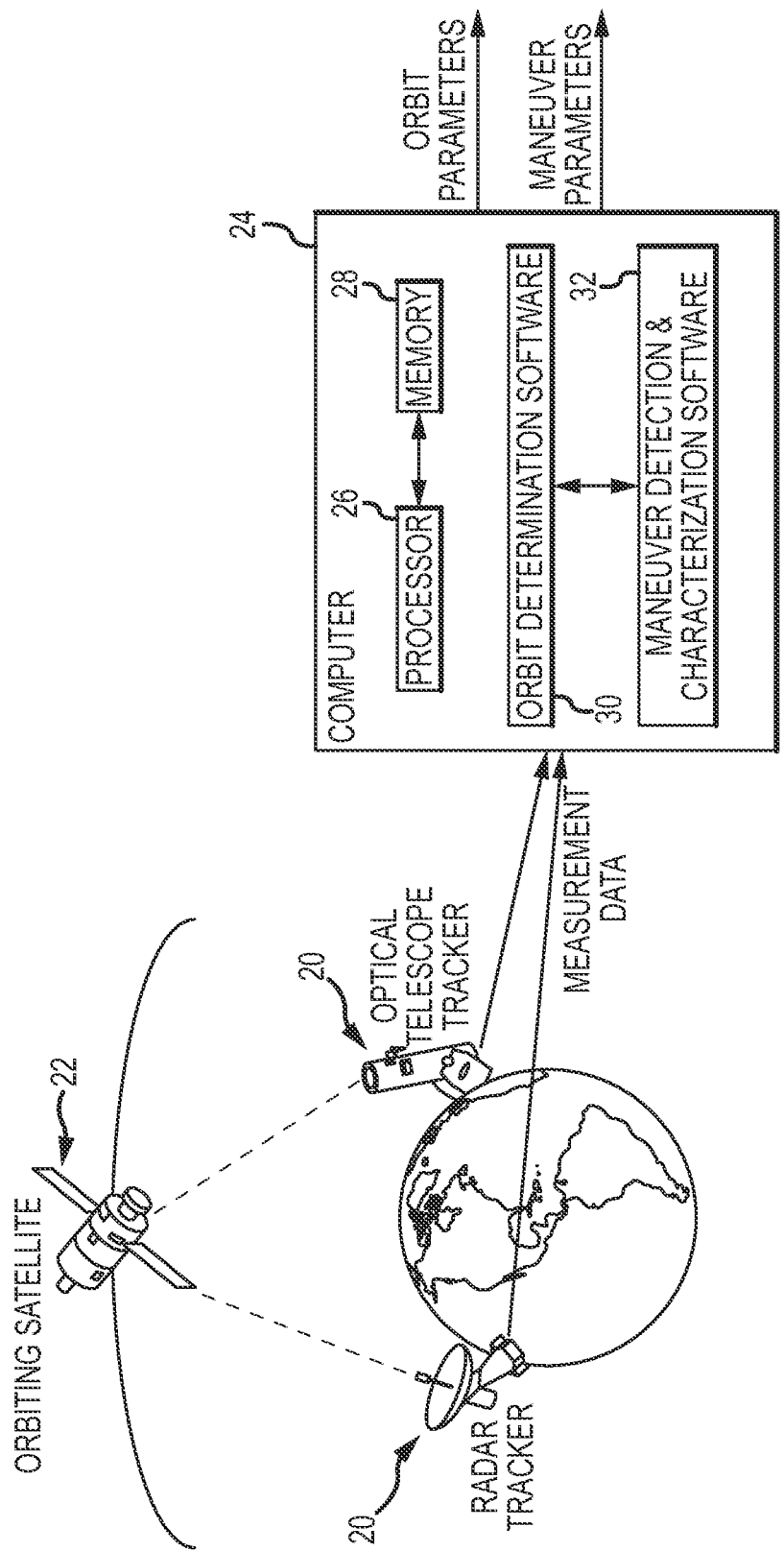
FIGS. 3A and 3B are block and flow diagrams of the orbit determination and maneuver characterization process.

In different embodiments, the invention is a series of processes which work with existing orbit determination systems (herein referred to as the "OD Engine"), and augment those systems to detect and characterize maneuvers. FIG. 3A illustrates the overall process: optical and radar trackers 20 provide measurement data on an Earth-orbiting satellite 22. The data is passed to a computer 24 (processor(s) 26, memory 28) configured to run Orbit Determination software 30 and the Maneuver Detection and Characterization software 32 to generate orbit and maneuver parameters.

Figure 3B:
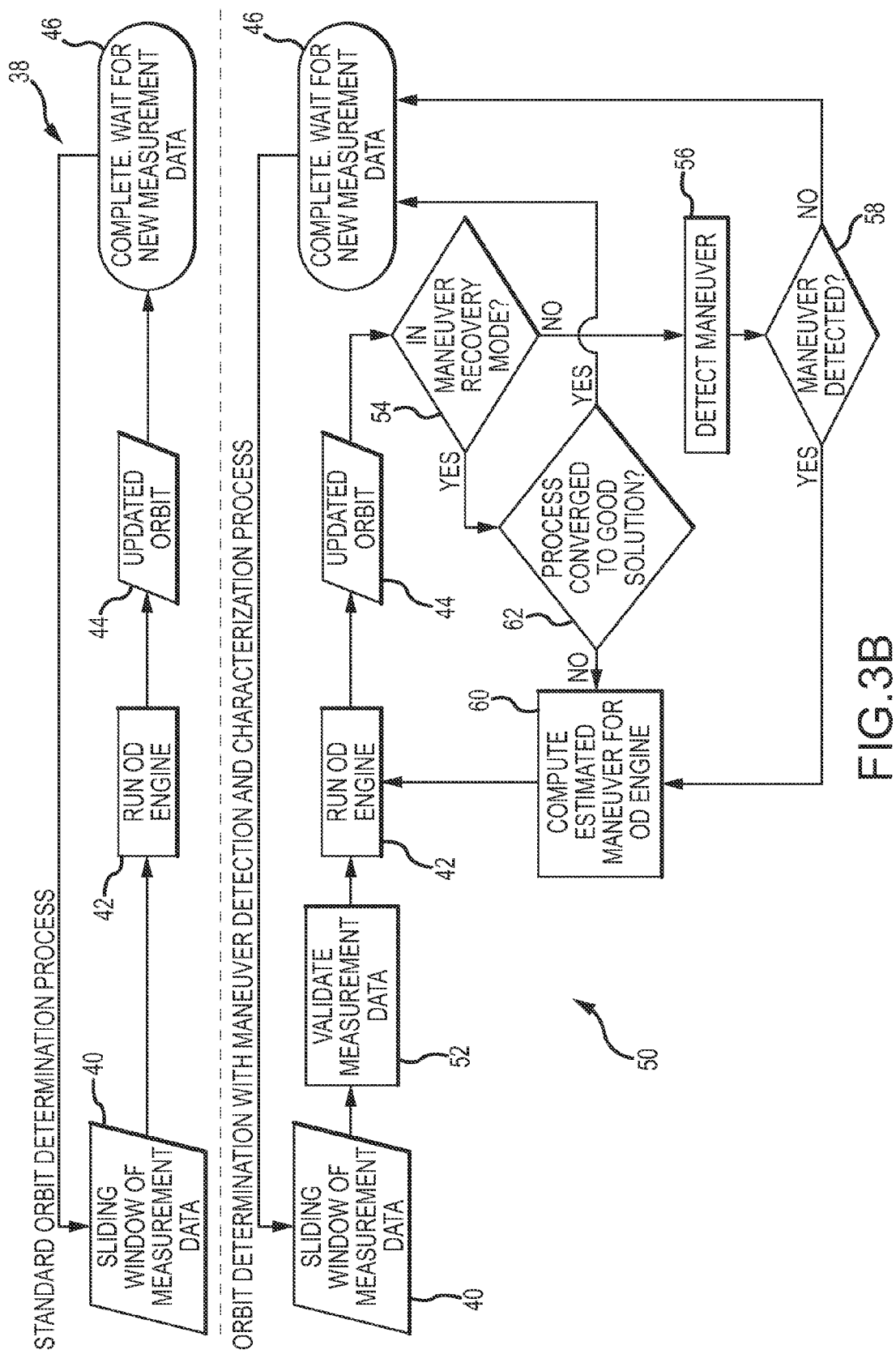

FIG. 3B illustrates a standard OD process 38 and an embodiment of maneuver detection and characterization. A typical OD process uses a "sliding window" of measurement data (step 40) (either explicitly in a BWLS, or by use of a "forgetting factor" in a EKF) by periodically taking in new measurement data, and running the OD Engine (step 42) to calculate an updated orbit (step 44), and then waiting for more measurement data before starting again (step 46).

In an embodiment, the invention adds a "wrapper" 50 around the OD Engine, which validates the measurement data (step 52) before the OD Engine is run, and then takes the results from the OD Engine, and if the process was not already in maneuver recovery mode (step 54), evaluates the OD results to determine if a maneuver has occurred (step 56). If no maneuver was detected, the process completes, like the standard OD process (step 58). If a maneuver is detected (step 58), the process applies a series of procedures to compute the estimated time, direction, and magnitude of the maneuver (step 60), providing that information to the OD Engine, running the OD Engine, and evaluating the results until the process converges to a good solution (step 62).

This process is not tied to a particular OD Engine, nor it is tied to particular measurement types—it is a process that can be used to enhance any orbit determination system to enable it to detect and characterize satellite maneuvers. If an EKF-based OD Engine is used, this process runs the EKF in a batch-like mode, re-processing the pre-maneuver data along with the post-maneuver data in order to get a good maneuver solution.

In different embodiments, the process validates measurement data that are consistent with the current orbit or allowable maneuvers for Earth-orbiting satellites. For example, the measurement data may be processed to remove allowable maneuvers thereby "flattening" the data. The flattened data is then thresholded to remove noise. The validated data is processed to detect both large and small maneuvers; large maneuvers that may have been rejected by standard data validation process and small maneuvers that may have been missed. Large maneuvers may present as "trends" in the residuals above the noise threshold from multiple sensors. Small maneuvers may present as a deviation from the expected orbit. The OD engine is suitably configured (as per normal operation) to enforce data reduction on any outliers (e.g. >3 sigma). The maneuver estimation routines employ an objective function for selection of maneuver estimates that combines a residual fit to the current orbit and maneuver, orbit consistency and a penalty for validated but unused data (data that is rejected by the OD engine). The combination of enforcing data reduction in the OD engine of validated data while penalizing that reduction biases the estimation routines to select maneuver estimates that fit all or substantially all of the validated data. The maneuver estimation routines also suitably use a center time and duration window to select the maneuver estimate and iterate the process as new measurement data is received to refine the maneuver estimate.

Maneuver Processing Flow

Figure 4:
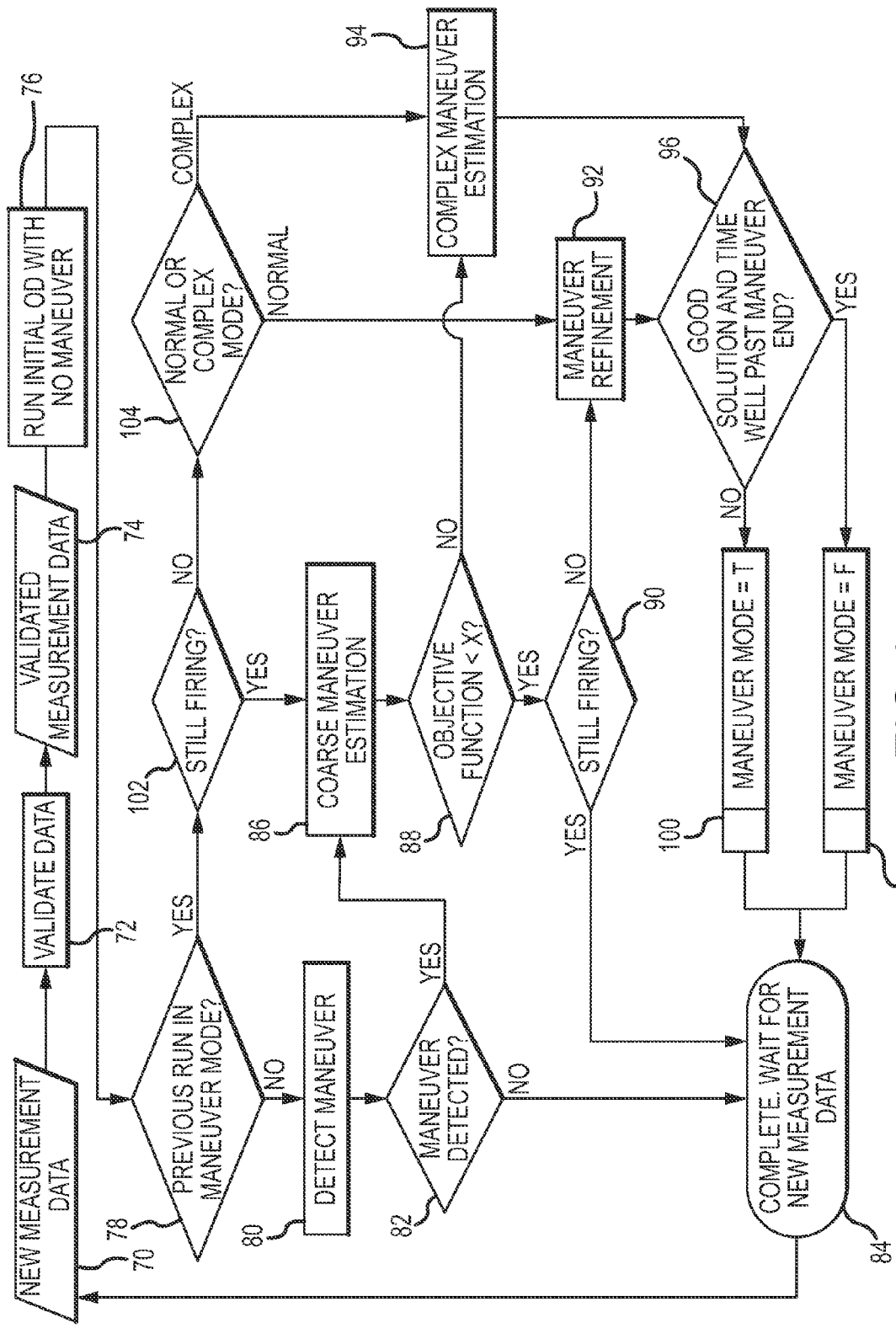
FIG. 4 is a detailed flow diagram of an embodiment of the maneuver detection and characterization process.

In an embodiment, the maneuver processing method is a multi-step, iterative process, which is repeated as new post-maneuver measurement data is received. An embodiment of this process is shown in FIG. 4. Maneuver processing starts when new measurement data is received (step 70). That data is validated through the Data Validation process (step 72), which identifies and removes outlier data while retaining good measurements and measurements that represent the effects of possible maneuvers. The validated measurement data (step 74) is then passed into the OD Engine, and an OD is performed assuming that no maneuvers have occurred (step 76).

If the previous run was not in maneuver mode (step 78), the Detect Maneuver process is initiated (step 80). This process reads the results of the OD run, and applies procedures to detect that a maneuver has occurred. If no maneuver is detected (step 82), the process is complete (step 84).

If the Detect Maneuver process does detect a maneuver (step 82), the Coarse Maneuver Estimation process is initiated (step 86). This process applies procedures to provide an initial, coarse estimate of the time, direction, and magnitude of the maneuver, as well as determining if the maneuver is still firing. If the Coarse Maneuver Estimation process results in an objective function less than the specified tolerance (step 88), and if the maneuver is still firing (step 90), the overall process is complete (step 84), and Coarse Maneuver Estimation process (step 86) will be run again when more measurement data is received. If the Coarse Maneuver Estimation process results in an objective function less than the specified tolerance, and the maneuver is not still firing, the Maneuver Refinement process is initiated (step 92). If Coarse Maneuver Estimation results in an objective function greater than the specified tolerance, the Complex Maneuver Estimation process is initiated (step 94).

The Maneuver Refinement process (step 92) takes the coarse maneuver estimate and applies an iterative procedure to refine the estimates of the maneuver time, direction, and magnitude. The Maneuver Refinement step is re-run several times when new measurement data is received to continue to refine the maneuver estimate with the new data. When a user-specified amount of post-maneuver data has been processed and the maneuver refinement results are good per the process' metrics (step 96), maneuver mode on this maneuver is ended and the Maneuver mode flag is set to False (step 98)—the parameters of this maneuver are final and are used as needed in future OD runs, but no further maneuver estimation is performed on this maneuver. If the user-specified amount of post-maneuver data has not yet been processed, Maneuver Mode is set to True (step 100) to flag the next run to continue solving for the maneuver. For example, the Coarse Maneuver Estimate process may provide a coarse maneuver estimate whose objective function satisfies an initial metric (<X) and the Maneuver Refinement process may refine the course maneuver estimate to provide an objective function that satisfies a final metric (<Y where Y<X).

If the Coarse Maneuver Estimate process (step 86) cannot provide a good initial solution per the process' metrics (step 88), the Complex Maneuver Estimation process (step 94) is initiated. This process is intended to handle complex maneuvers, such as maneuvers in unusual directions or those with non-constant thrust (for example, a pulsed thruster). The Complex Maneuver Estimation step is re-run several times when new measurement data is received to continue to refine the maneuver estimate with the new data. When a user-specified amount of post-maneuver data has been processed and the Complex Maneuver Estimation results are good per the process' metrics, maneuver mode on this maneuver is ended.

If the previous run was in maneuver mode (step 78), the process checks to see if the maneuver is still firing (step 102). If yes, the process passes to Coarse Maneuver Estimation process (step 86). If no, the process determines whether in normal or complex mode (step 104) and routes the process to either Maneuver Refinement (step 92) or Complex Maneuver Estimation (step 94).

Figure 5:
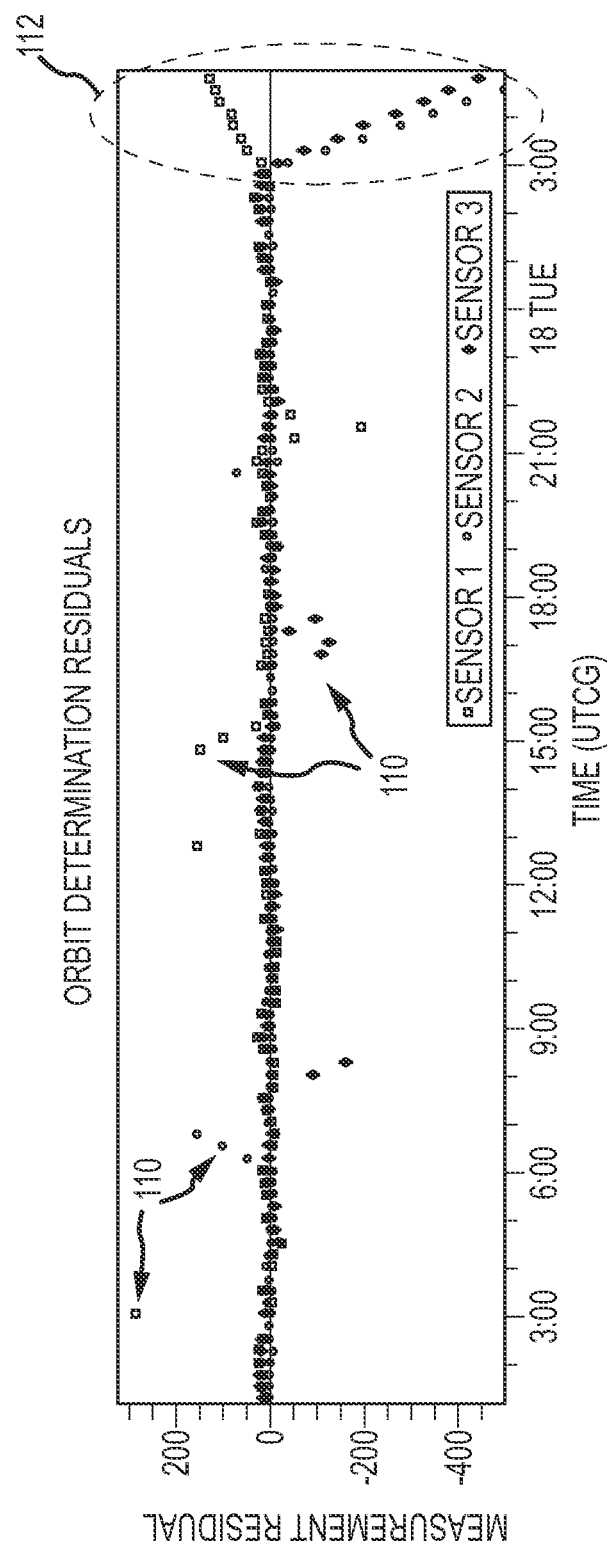
FIG. 5 is a plot of measurement residuals versus time illustrating outlier data that is both noise and good maneuver data.

After maneuver mode has ended, the solution for that maneuver is final. After this, when new measurement data is received, the process returns to normal, and looks for additional maneuvers Data Validation Standard OD processes generally have built-in data rejection methods to identify and reject bad measurement data. These methods typically reject data that is more than N* sigma (sigma being a standard deviation of the residuals) from the mean of the residuals, or a similar method (such as N times the RMS of the residuals). In the absence of a maneuver, these methods work fairly well. But when there is a maneuver, these methods risk rejecting the data which is indicating that a maneuver has occurred. This situation is illustrated in FIG. 5—in this case, an "N-sigma" rejection method will reject both the outlier data 110 on the left, which may be the result of different noise sources, as well as the data 112 on the right which is showing the effects of a maneuver. We want to reject outlier data 110 and retain maneuver data 112.

FIGS. 6A and 6B are plots of simulated position type measurements 120 (Range, Az, El, RA/Dec) and velocity-type measurements 122 (Doppler, Angle rates) before and after a maneuver. Over periods of minutes to hours, orbit maneuvers induce linear or quadratic trends in OD residuals. Data exhibiting such trends should be retained. Data that does not exhibit a trend that is consistent with either the current orbit or a valid maneuver should be rejected.

In an embodiment, Data Validation implements a "filter" that extracts data that is consistent with the trajectory or "trend" of a valid maneuver of an Earth-orbiting satellite. This data is "validated" and retained. The remaining data is rejected.

In general, the Data Validation filter removes any data trend that is consistent with an allowable maneuver. These trends are typically linear or quadratic but in general could be any arbitrary function that characterizes an allowable maneuver. By removing these trends, the filter tends to "flatten" the data so that it appears as if no maneuver had occurred. As a result of this pre-processing, an N* sigma threshold can be applied to the data to identify and noisy data without removing maneuver data. The filter is applied in both the forward and backward directions. If data points fail in both directions they are rejected.

The data validation process, called "double differencing", takes advantage of the fact that over periods of minutes to hours, orbit maneuvers induce linear or quadratic trends in OD residuals. Double Differenced residuals are computed as illustrated below:

| Residuals: | RESID1 RESID2 RESID3 |
|---|---|
| Single Differenced: | (RESID2 − RESID1) (RESID3 − RESID2) |
| Double Differenced: | [(RESID3 − RESID2) − (RESID2 − RESID1)] |

Double-differencing, which is analogous to differentiating a function twice, effectively "flattens" linear or quadratic trends, allowing the identification of data that does not follow these trends. Data showing such trends is retained, but other outlier data is removed. To effectively employ the double-differencing process, a multi-pass methodology is used.

An embodiment of a data validation process is illustrated in FIG. 7. New measurement data is provided (step 130). The OD Engine is configured (step 132) and run (step 134) to compute residuals without estimating the orbit, and with no maneuvers modeled. The process then reads in the "scaled" residuals—the residuals divided by their measurement sigma.

The first step is to reject "gross outliers"—data that is extremely far from the expected orbit (step 136). Rejection is done on an N* sigma basis, using a much larger value of N than the normal 3, such as 50 or more. Care must be taken here to ensure that the largest maneuver which is expected, will cause residuals less than this value, to ensure that maneuver data is not rejected.

Next, the residuals are separated into "arcs" (step 138). An arc is defined as a series of measurements of the same type (i.e. range), from the same tracking sensor, which are each within M minutes of the next point. All subsequent processing is done per data arc.

For each arc, if there are <3 points in the arc (step 140), no further processing is performed. If there are 3 or more points in the arc (step 140), then "end point" logic is applied first. The first three points are double-differenced (step 142) as shown in the equation above. If the double-difference is >6-sigma, the first two points in the arc are rejected. Both points are rejected in this case because there is no way to determine which of the two (or both) are bad. This same logic is applied to the last 3 points in the arc.

Figure 6:
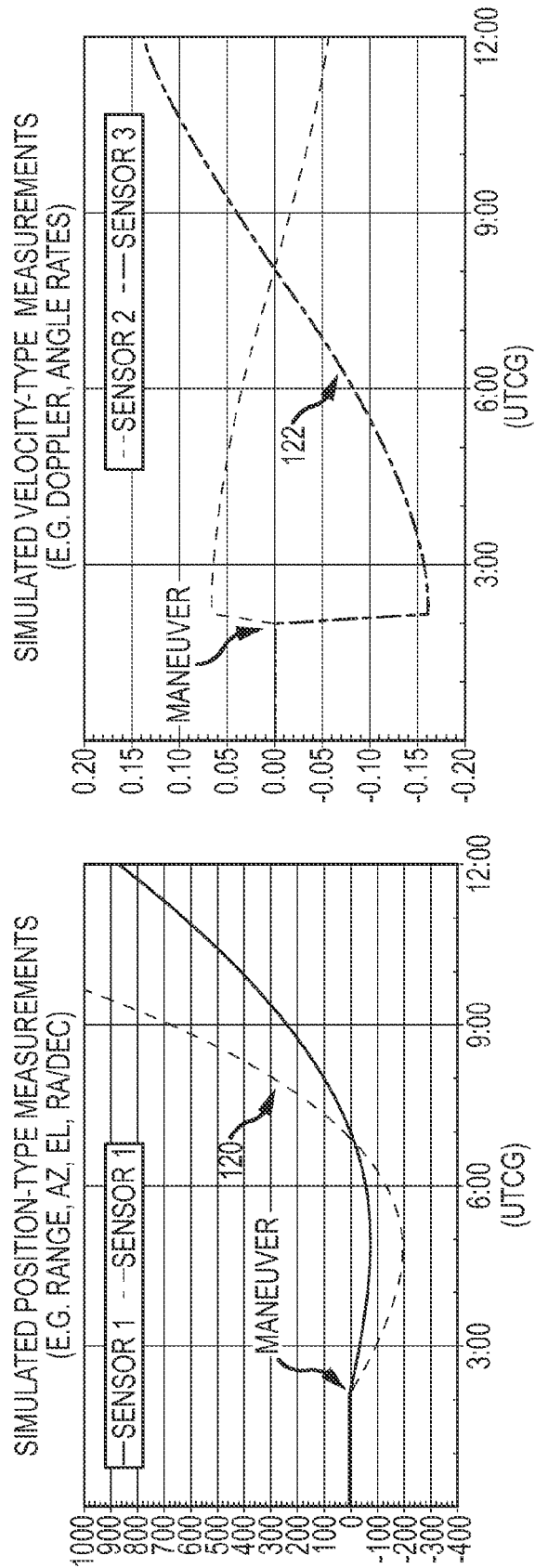
FIGS. 6A and 6B are plots of simulated position and velocity type residuals illustrating data trends indicative of possible satellite maneuvers.

The next step is to apply double-differencing logic to the rest of the arc. Each point in the arc is double-differenced (e.g. to double-difference residual #7, the double-difference equation is applied to residuals #7, 8, and 9), and if its double-difference is >6-sigma (6 is used because it is the maximum expected noise between two points—from −3-sigma to +3-sigma), it is flagged. The double-differencing is then repeated in the backwards direction (e.g. using residuals #7, 6, and 5) (step 144). Only if a residual is flagged in both the forward and backward double-difference is it rejected—this is done to allow for step-function-type changes in the residuals due to: 1) bias changes in position-type measurements (due to equipment changes, etc.); and 2) step-function-type changes in velocity-type measurements after a maneuver, as illustrated in FIG. 6.

A "middle point" check is then done (step 146): if a residual is in between two residuals that have been rejected, the middle point is also rejected because it is very unlikely that the middle point is really a good point.

Forwards and backwards double-differencing passes are then performed a second time (step 148), and any residuals which fail both tests are rejected.

Finally, a check is done to calculate the % of residuals per arc that have been rejected by the above steps, and if >X % of the residuals (usually set to 50-60%) in an arc have been rejected, the entire arc is rejected (step 150).

The process is repeated (step 152) until all of the arcs are processed. The measurement data associated with retained arcs is output as validated measurement data. (step 154)

Maneuver Detection

Maneuver detection processes operate by comparing new measurements of the satellite's position and velocity against the predicted position and velocity, and if the difference is greater than a tolerance, a maneuver has been detected. The accuracy of these processes is dependent on the accuracy of the pre-maneuver orbit, the accuracy and frequency of the measurements, and the size of the maneuver. Having an effective method for validating the measurement data, as described above, improves the pre-maneuver orbit, ensures that bad data doesn't erroneously trigger detection of a maneuver, and ensures that data showing the effects of a maneuver is retained. To handle large and small maneuvers, a two-part detection process has been developed.

Figure 8:
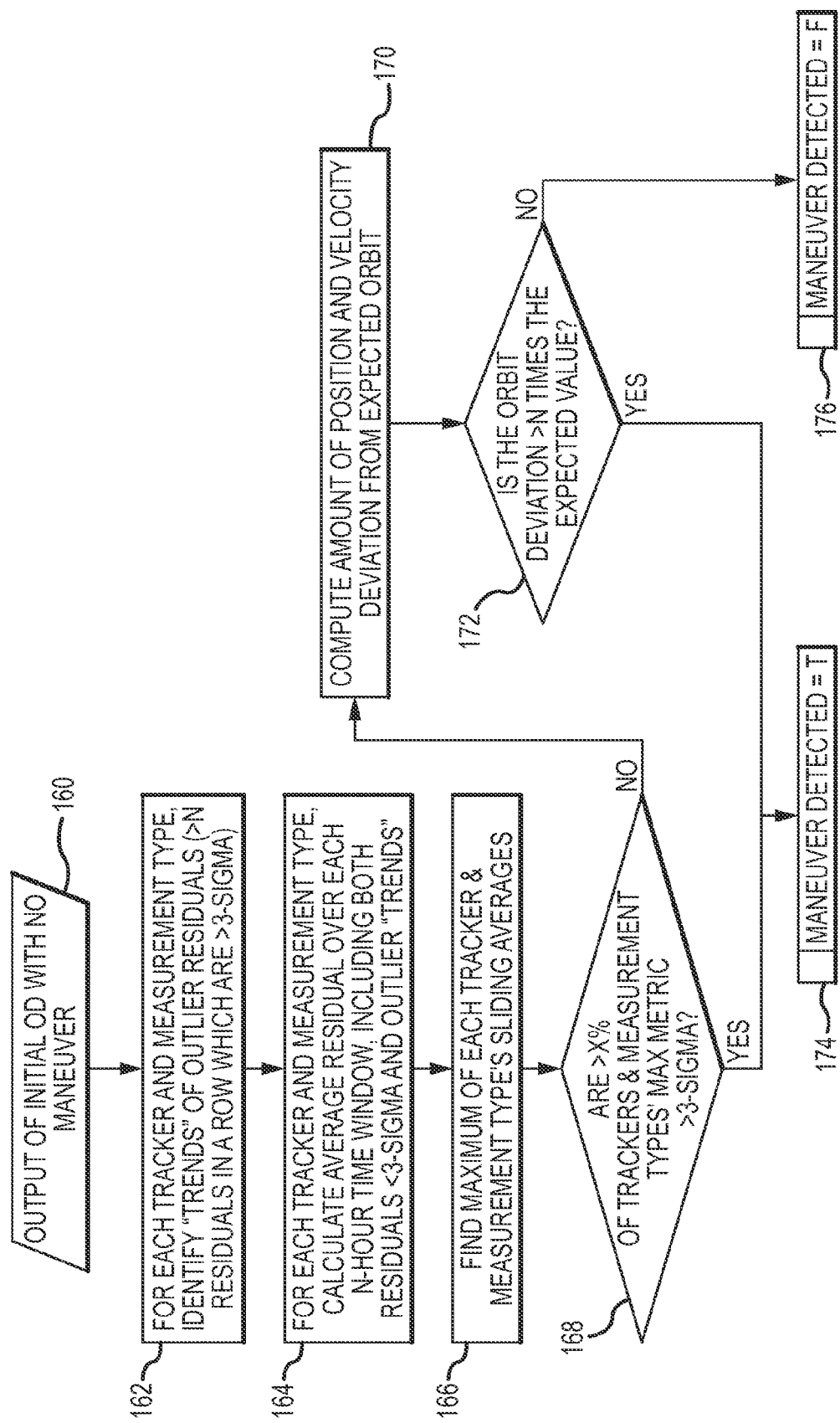
FIG. 8 is a flow diagram of an embodiment of a maneuver detection process for detecting large or small maneuvers from validated data.

An embodiment of this process, which has been demonstrated to be effective for satellites which are tracked routinely and do not have large tracking data gaps, is illustrated in FIG. 8. This process starts with the output of the data validation process—residuals, with bad data removed, computed by the OD Engine without estimating the orbit, and without any maneuvers modeled. First, a large maneuver detection process is used, and if no maneuver is detected, the small maneuver detection process is used.

Large maneuvers will cause the OD residuals to rapidly diverge, as shown on the right side of FIG. 5. These residuals will quickly exceed 3-sigma limits, and the residuals will continue to become larger with time and trend away from the pre-maneuver orbit. Thus, the large maneuver detection process identifies residuals which are "trends" of data >3-sigma.

One approach is to simply declare that any data >3-sigma that is validated is indicative of a large maneuver. The Data Validation process itself looks for trends in the data. Another approach is to add an additional layer of noise filter to the validated data to remove any noise that may have survived the Data Validation process.

An embodiment of a large maneuver process, as shown in FIG. 8, takes the output of an initial OD with no maneuver (step 160) and identifies residuals for each tracker and measurement type which are outside of the expected measurement bounds (>3 sigma) (step 162), and are part of a "trend" of data, defined as more than N measurements in a row of the same measurement type and from the same tracker which are >3 sigma. As shown in FIG. 6, a maneuver will cause the residuals to deviate away more and more from the expected values over time; only using "trends" of data prevents "outlier" measurements which were not rejected by the data validation process from falsely triggering a maneuver. Then, using a smaller sliding window of N hours of measurements, the process calculates the average residual for all residuals in the window that are <3 sigma or are part of a "trend" of data identified in the previous step (step 164). Finally, the maximum of the averages for each tracker & measurement type is found (step 166), and if the maxima for >X % of the trackers & measurement types is >3-sigma (step 168), a maneuver has been detected (step 174). The >X % check is used to ensure that, if there are multiple measurement types and/or trackers available, that a maneuver isn't declared until multiple measurement types and/or trackers show the effects of the maneuver so that a single tracker/measurement type which goes bad doesn't falsely trigger a maneuver.

Small maneuvers can cause the orbit to very slowly drift from the pre-maneuver orbit, and since standard OD processes process a "sliding window" of data (either explicitly in a BWLS, or by use of a "forgetting factor" in a EKF), the OD may be slowly incorporating the maneuver effects in each update, and the measurements may not exceed 3-sigma to trigger the previous test. So, for cases in which the large maneuver test does not detect a maneuver in step 168, a second "small maneuver" test is employed. An embodiment of the small maneuver detection process, as shown in FIG. 8, is to compute the amount that the measured orbit is deviating with time (step 170). If the orbit has deviated more than N times the expected variation, a maneuver is detected (step 172). The small maneuver test cannot be used to detect large maneuvers, because the rapid deviation of the residuals will cause them to be rejected by the OD engine, and therefore the orbit will not deviate over time. If either a small or large maneuver is detected Maneuver Detected=True (step 174) otherwise Maneuver Detected=False (step 176).

An embodiment of the orbit deviation test for an EKF-based OD Engine is to calculate the difference between the filter and smoother ephemerides, and calculate the McReynolds Filter-Smoother Consistency test. If this test is >X, a maneuver is detected.

An embodiment of the orbit deviation test for a BWLS-based OD Engine is to calculate the amount the satellite position and velocity change with every OD run, and track how much the values change during non-maneuver time periods—the amount the position & velocity normally change due to non-maneuver orbit perturbations. If the position and velocity changes over the last N OD runs are >X times their normal change, a maneuver is detected.

Maneuver Solution Parameters

Throughout the rest of the maneuver processing, maneuver parameters will be solved for to model the maneuver effects. The time that the maneuver starts and ends, the direction of the thrust, and the magnitude of the thrust all affect the way the maneuver changes the orbit.

An embodiment of the maneuver solution parameters process is described here. Maneuver start and stop times are important parameters for accurate maneuver characterization. However, as is illustrated in the residuals 180, 182 and 184, shown in FIGS. 9A-9C, respectively, solving for maneuver center time and duration has been demonstrated to be more effective and stable than solving for maneuver start time and stop time, even though both sets of parameters are mathematically equivalent. The reason for this is that the maneuver duration can be traded off with the maneuver thrust level, and still result in the same overall maneuver size $$\left(\Delta Velocity = \frac{Thrust \cdot Duration}{Mass}\right).$$

De-coupling the "time" of the maneuver from the duration allows the process to solve for maneuver "time" independently of the duration/thrust level, and results in a more stable and accurate solution. Within reason, maneuver duration can be increased or decreased from the "correct" value, with corresponding decreases or increases in thrust magnitude, and a good maneuver solution still results. However, if the maneuver center time is not correct, it is very difficult to get a good solution. Therefore, the maneuver estimation processes preferably focus on solving for maneuver center time. Alternate techniques could solve for maneuver start and finish times.

Objective Function

Throughout the rest of the maneuver processing, a metric is needed to evaluate the quality of the maneuver solution. This metric should incorporate as much relevant information as possible, and the metric should be defined such that when all constituents of the metric are minimized, this indicates a good maneuver and orbit solution.

An embodiment of this objective function is defined here. It has been found that there are 3 constituents to a good objective function for maneuver characterization: 1) a measure of the quality of the fit of the measurements to the current orbit and maneuver estimate (e.g. the standard OD residual RMS metric), 2) a measure of the consistency of the orbit position and velocity pre- and post-maneuver, and 3) a penalty for validated measurement data that is rejected by the OD Engine:

Objective Function=Fit Quality+Orbit Consistency+
Rejection Penalty

The measurement rejection penalty is a particular innovation to this the objective function process. As described in the Data Validation process, standard OD Engines generally have built-in data rejection methods to identify and reject bad measurement data. These methods typically reject data that is more than N* sigma from the mean of the residuals, or use a similar method. In this maneuver estimation process, however, the bad measurement data has already been rejected by the Data Validation process, leaving, ideally, only good measurements (those consistent with the current orbit) and measurements which show the maneuver effects. Notwithstanding that, the OD engine's built-in data rejection method is enabled. As such the OD engine will reject good maneuver data that that appears to be an outlier for the current maneuver estimate and will reject any noisy data that survived data validation.

To force the maneuver estimation processes and the OD Engine to find a maneuver that fits as much of the measurement data as possible, a data rejection penalty is applied to the objective function. This is illustrated in FIGS. 10A-10C. FIG. 10A shows a pre-maneuver OD and the effects of a maneuver on the residuals 190. FIG. 10B shows a near-final maneuver estimate and the effects of a maneuver on the residuals 192, which has good residual and orbit consistency metrics, but is rejecting 4 measurements. As shown, the data rejection penalty heavily penalizes this solution, and the maneuver estimation process refines the maneuver estimate to the solution shown in FIG. 10C, which only slightly improves the residual and consistency metrics, but now none of the residuals 194 are rejected. Testing has shown that the penalty component is effective to force a solution that accurately finds the center time of the maneuver.

An embodiment of the objective function for Extended Kalman Filter-based OD Engines is defined here. The objective function is defined as the sum of: 1) a scaled sum of the RMS of the scaled residuals for each measurement type used, 2) the McReynolds Filter-Smoother Consistency test in both position and velocity, and 3) N times the number of measurements that were rejected by the EKF OD process (N is usually set to 3).

An embodiment of the objective function for Batch Weighted Least-Squares-based OD Engines is defined here. The objective function is defined as the sum of: 1) a scaled sum of the final RMS of the scaled residuals for each measurement type used, 2) the scaled position & velocity error between a pre-maneuver position and velocity vector propagated, including maneuver effects, to the maneuver center time and a post-maneuver position & velocity backward-propagated, including maneuver effects, to the maneuver center time, and 3) N times the number of measurements that were rejected by the BWLS OD process.

Coarse Maneuver Estimation

Once a maneuver has been detected, the characterization of the maneuver begins. To allow the OD process to fit measurement data before and after the maneuver, the maneuver start time, stop time, the direction of the thrust (3 axes), and the magnitude of the thrust in each axis must all be determined. However, solving for all 8 of these parameters simultaneously is very difficult. In an embodiment, a coarse maneuver estimation process is performed to estimate a few of the key parameters using physics-based multiple-hypothesis methods to constrain the solution, after which the maneuver parameters can be refined.

Figure 11A:
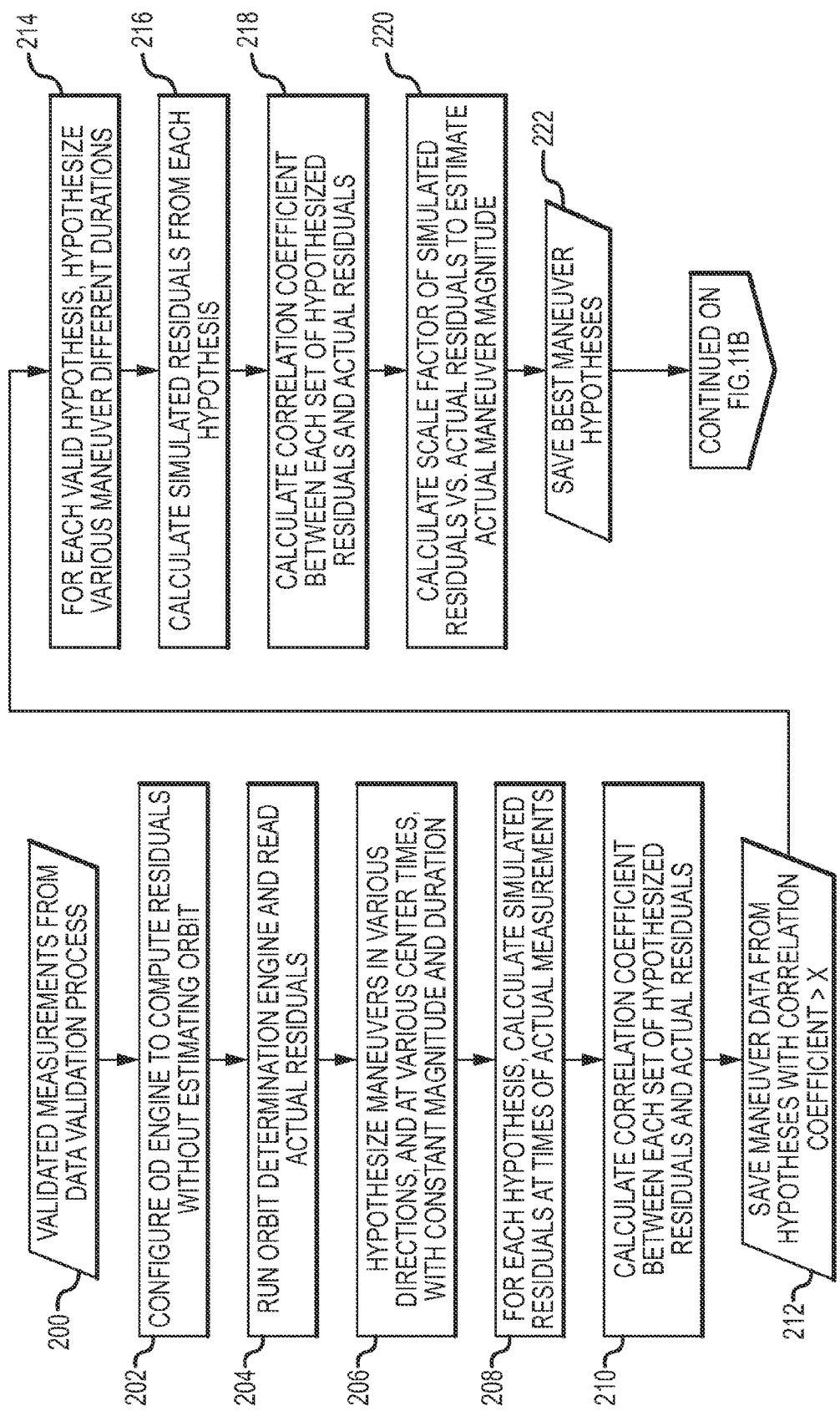
FIGS. 11A and 11B are a flow diagram of an embodiment of a coarse maneuver estimation pattern matching routine.
Figure 11B:
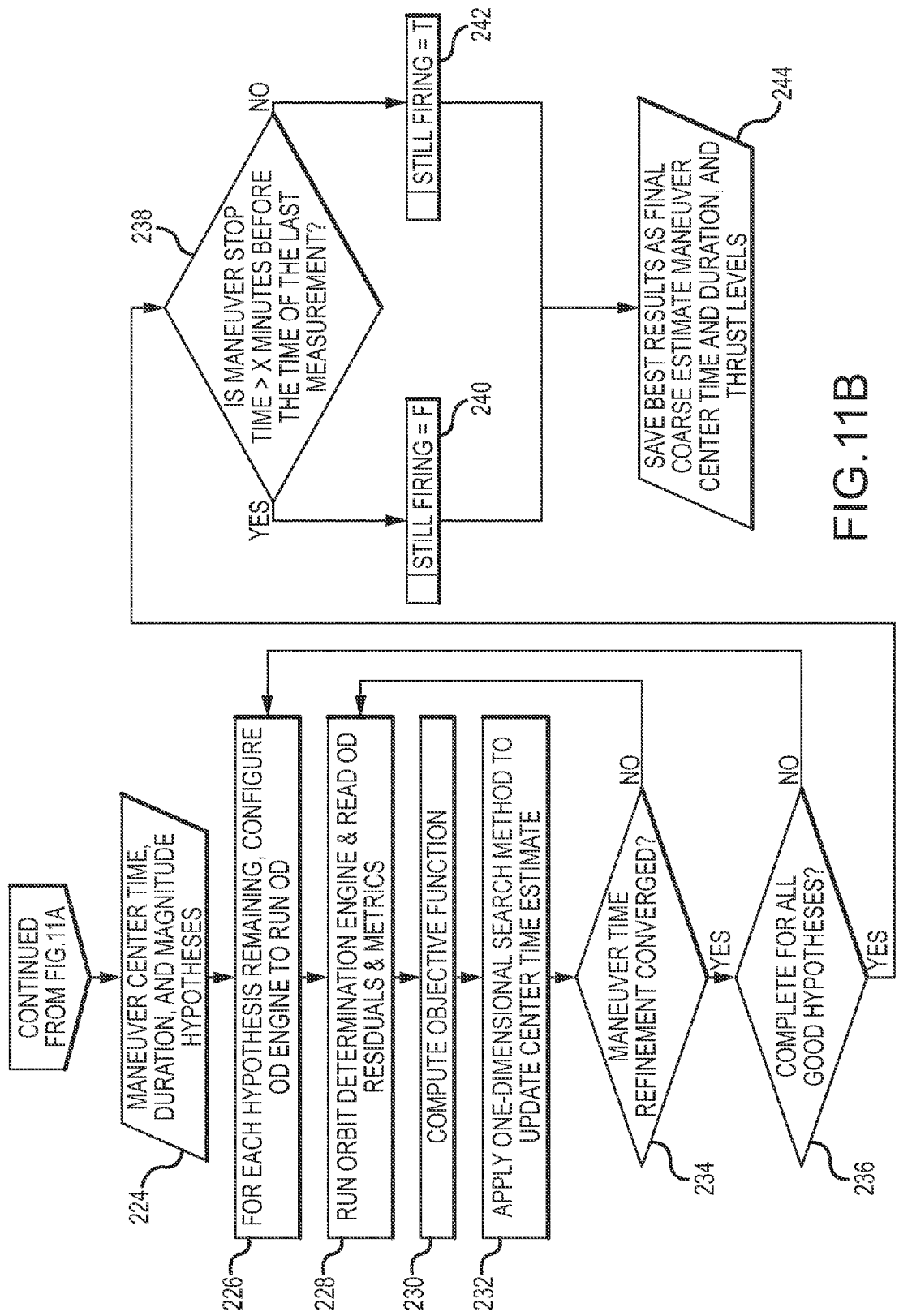

A "pattern matching" embodiment of the coarse maneuver estimation process is illustrated in FIGS. 11A and 11B. This process hypothesizes a series of maneuvers in likely directions at various times, simulates the residuals for this maneuver, and compares the simulated residuals to the actual residuals to see if their patterns match.

This process begins with validated measurement data from the Data Validation process (step 200). The OD Engine is configured (step 202) and run (step 204) to compute residuals without estimating the orbit, and the resulting residuals are read. Next, the process hypothesizes maneuvers in various likely directions (cross-track, in-track, and others that the user may define), at various center times, with constant magnitude and duration (step 206). For each hypothesis, the OD Engine is provided with the hypothesized maneuver, and is configured to simulate measurements from the same trackers, at the same times as the actual measurement data, and residuals are computed (step 208). Finally, a correlation coefficient is calculated between the actual residuals and the simulated residuals (step 210), and the hypotheses with correlation coefficients >X are saved as possible solutions (step 212).

With the possible maneuver solutions, the process is repeated for various maneuver durations (step 214)—simulated residuals are calculated (step 216) and the correlation coefficients are calculated (step 218). Next, the maneuver magnitude is estimated by computing the scale factor between the simulated and actual residuals for the good hypotheses (step 220). The best maneuver hypotheses are saved (step 222)

Then, for each possible maneuver, the maneuver center time, duration, and magnitude hypotheses (step 224) are provided to the OD Engine, and the OD Engine is configured (step 226), and run (step 228) to process the measurements and solve for the orbit state and the thrust level in all 3 axes.

The results of the OD are read in, and the objective function is computed (step 230). Finally, a one-dimensional search method such as the Golden Section search method (Press, W. H., Teukolsky, S. A., Vetterling, W. T., and Flannery, B. P. (2007). *Numerical Recipes: The Art of Scientific Computing*. New York: Cambridge University Press. pp. 492-496) is used to search for the best maneuver center time (step 232). At each iteration step, the OD Engine is run to estimate the orbit and the thrust levels, and the objective function is used as the optimization metric. When the center time search has converged (step 234) and the process is complete for all good hypotheses (step 236), the process determines if the maneuver stop time is >X minutes before the time of the last measurement used (step 238). If so, a "StillFiring" flag is set to False (step 240) to signal that this maneuver is ready for refinement and the coarse estimation process is complete. If no, the "StillFiring" flag is set to True (step 242). Based on the user's preferences, all hypotheses that have objective functions less than a specified level can be retained, or else just the best solution is retained (step 244).

Figure 12A:
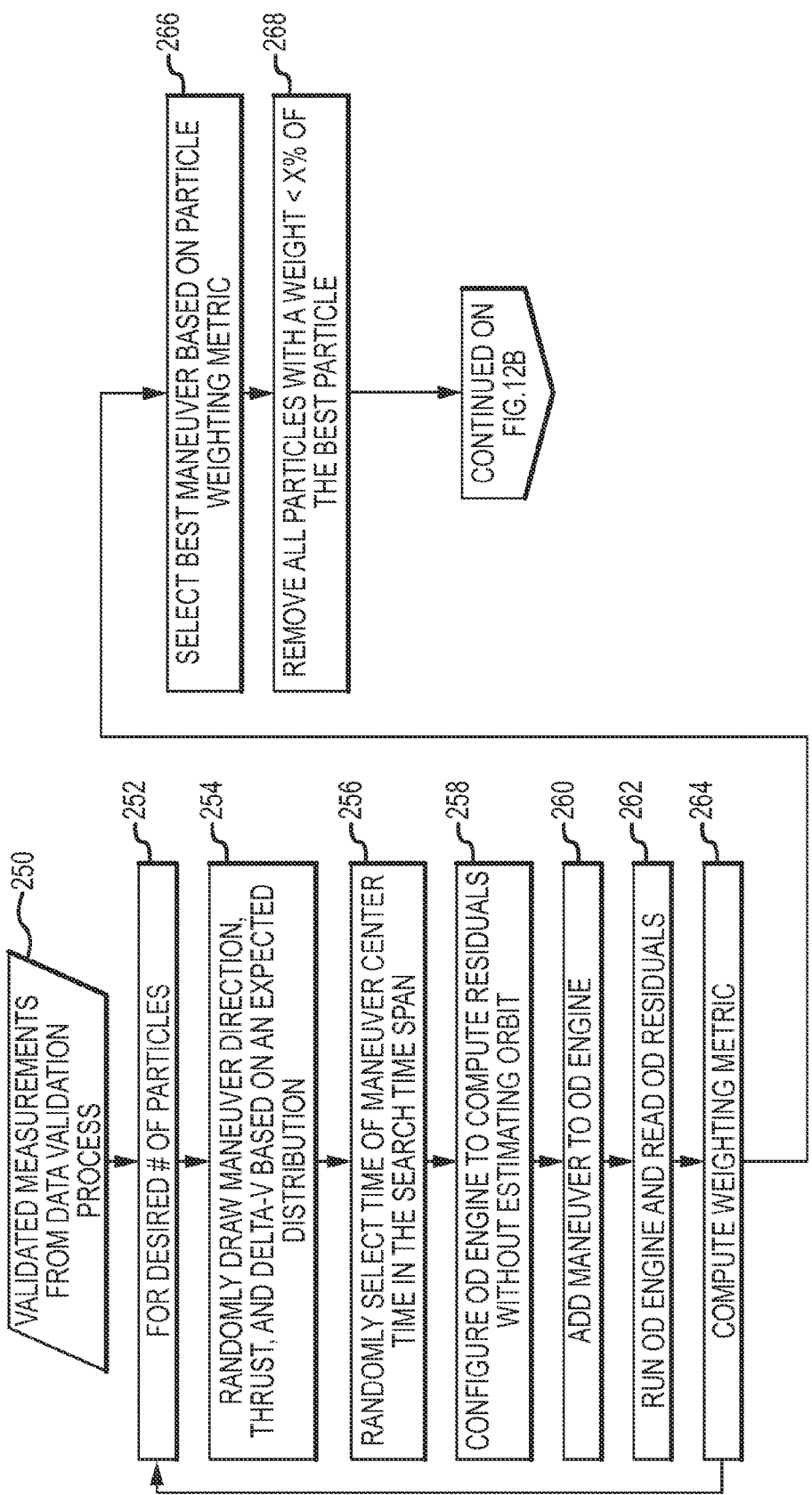
FIGS. 12A and 12B are a flow diagram of an embodiment of a coarse maneuver estimation stochastic optimization routine.
Figure 12B:
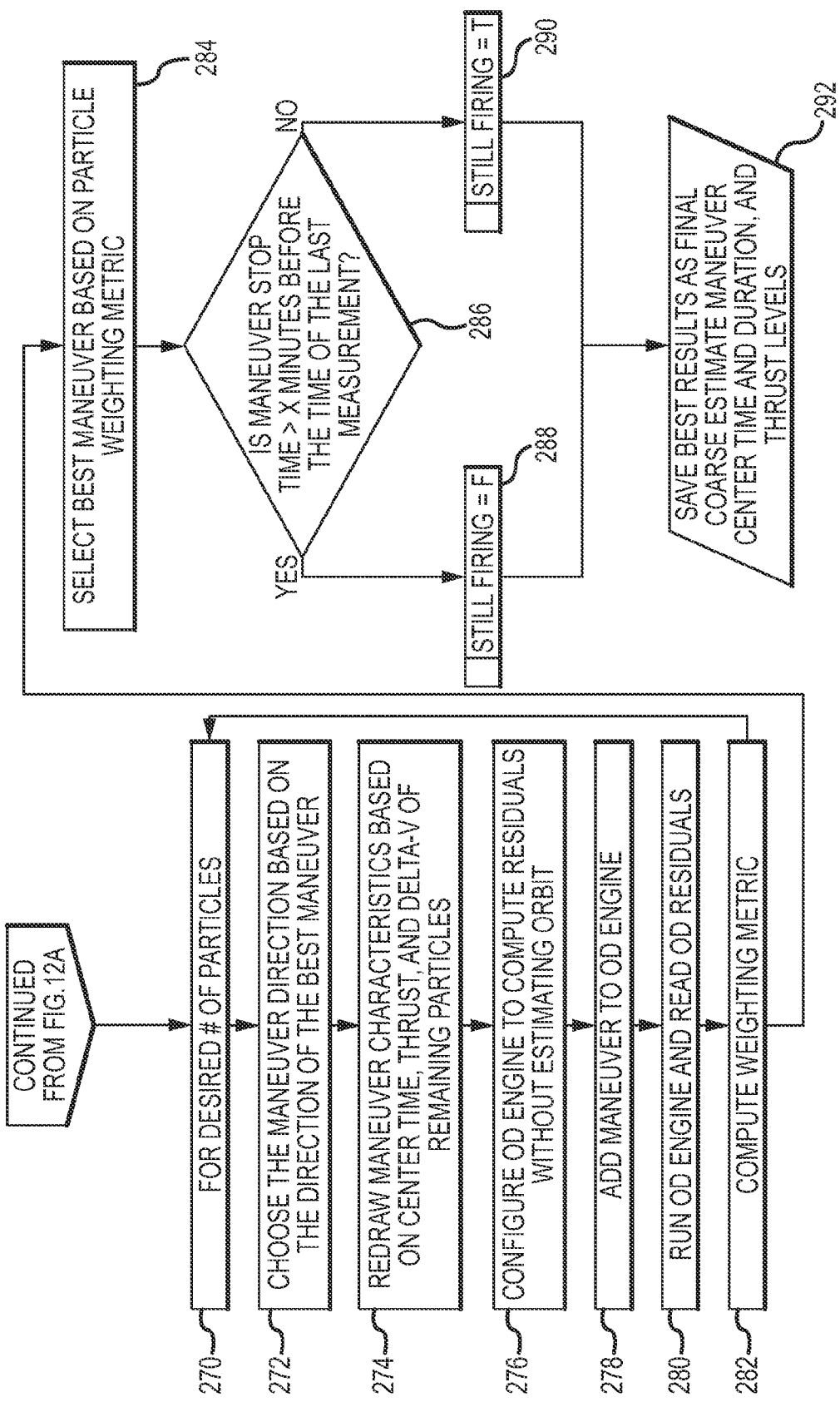

Another embodiment of the coarse maneuver estimation process is the stochastic optimization process illustrated in FIGS. 12A and 12B. This process is derived from statistical optimization techniques (Nocedal, J., and Wright, S. *Numerical Optimization*, $2^{nd}$ edition New York: Springer (2006)) including the particle filter (Simon, D. (2006). *Optimal State Estimation: Kalman, H-infinity, and Nonlinear Approaches*. Hoboken, N.J.: Wiley. pp. 461-481).

The process begins with validated measurement data from the Data Validation process (step 250). For the desired number of particles (step 252), maneuver direction, thrust, and total magnitude values are randomly drawn based on expected distributions of those parameters (step 254). The distributions can be derived from previously observed maneuvers, or from information about the satellite (thrusters used, etc.) and its orbit (what kind of maneuvers are needed for this orbit, what approximate magnitude is expected, etc.). The time of the maneuver center time in the search time span is randomly selected (step 256). For each particle, the OD Engine is configured to compute residuals without estimating the orbit (step 258), the particle's maneuver information is provided to the OD Engine (step 260), and the OD Engine is run to compute residuals (step 262). The residuals are read, and a weighting metric, the reciprocal of the overall RMS of the residuals, is calculated (step 264). The best particle is selected based on the weighting metric (step 266), and all particles with weights <X % different than the best particle are removed (step 268). For the desired number of particles (step 270), the particles are then re-sampled by first constraining the maneuver direction to be in the direction of the best particle (step 272), and then randomly drawing new maneuver center time, thrust, and total magnitude values based on the characteristics of the remaining particles (step 274). The OD Engine is configured (step 276), the maneuver added (step 278) and run (step 280) to compute residuals based on each particle, and new weighting metrics are computed (step 282). The best particle is selected based on a particle weighting metric (step 284), and finally, if the best particle's maneuver stop time is >X minutes before the time of the last measurement being used (step 286), the Still Firing flag is set to False (step 288) to signal that this maneuver is ready for refinement otherwise the flag is set to True (step 290). The best results are saved as the coarse estimate (step 292).

Maneuver Refinement

If the coarse maneuver estimation process has found a good solution and the maneuver is not still firing, the maneuver refinement process is performed. Maneuver refinement is a useful step in the overall maneuver detection and characterization process, because as time goes on, the post-maneuver orbit deviates more and more from the pre-maneuver orbit (see FIG. 6), and the maneuver effects become more and more measurable, so as new measurements are received, maneuver refinement ensures the best solution. FIGS. 13A-13C illustrate the residuals 300, 302 and 304, produced by the Coarse Maneuver Estimation and Maneuver Refinement processes: although the coarse estimation process has resulted in a much better fit than the OD with no maneuver, maneuver refinement achieves a better quality solution.

Figure 14:
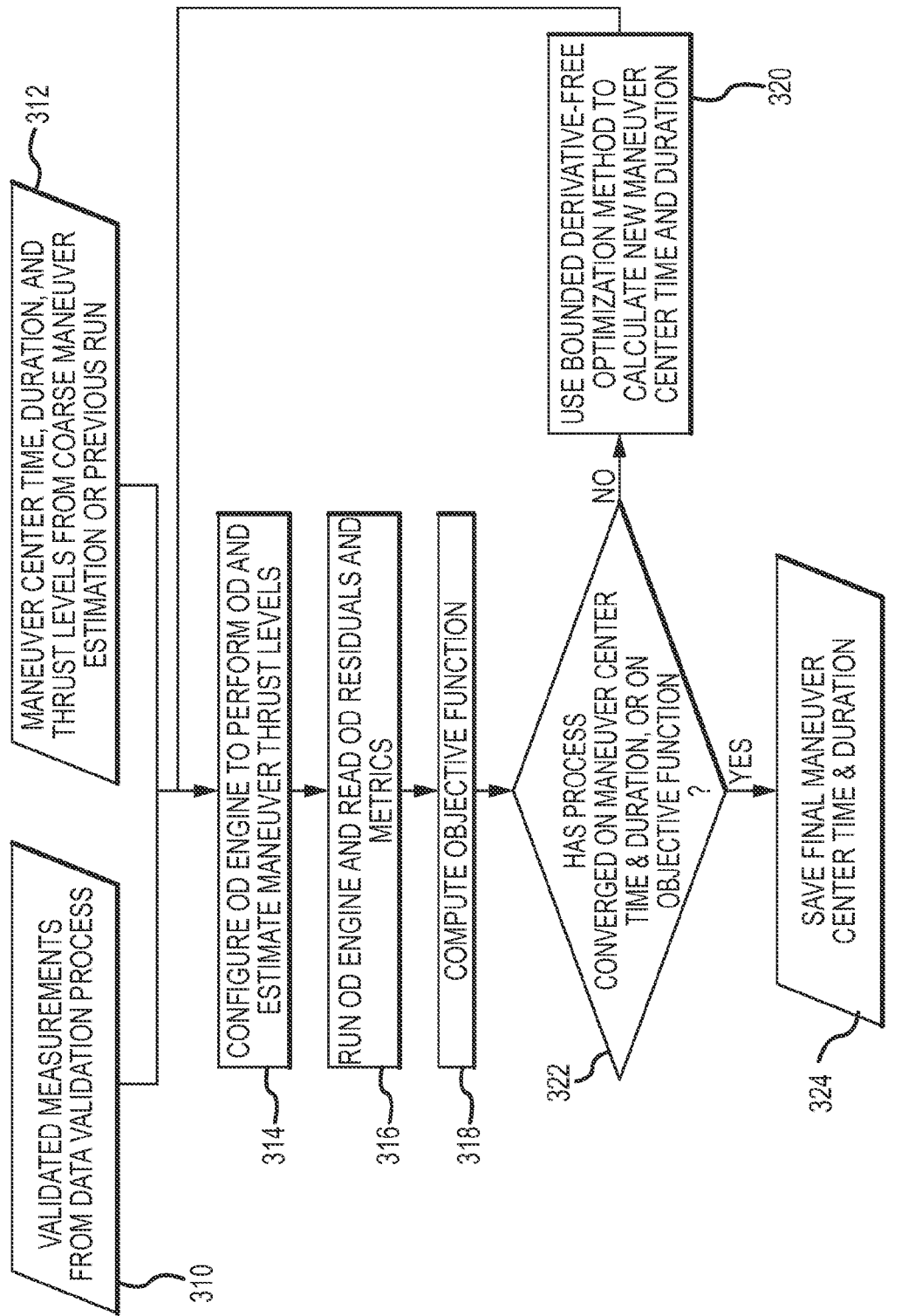
FIG. 14 is a flow diagram of an embodiment of a maneuver refinement process.

An embodiment of the maneuver refinement process is illustrated in FIG. 14. The process begins with the validated measurements from the Data Validation process (step 310) and the maneuver center time, duration, and thrust levels from the Coarse Maneuver Estimation process (step 312). Maneuver refinement begins by configuring the OD Engine to process the measurements and estimate the orbit and the maneuver thrust levels (step 314), running the OD Engine, reading the results (step 316), and computing the objective function (step 318). An optimization method such as a bounded two-dimensional derivative-free optimization method is then employed to calculate a new maneuver center time and duration (step 320). Examples of methods that can be employed here include: the Nelder-Mead method, the Pattern Search method, Powell's method, and the Simulated Annealing method. The Nelder-Mead and Pattern Search methods are described in Nocedal, J., and Wright, S. Numerical Optimization, $2^{nd}$ edition (2006) pages 238-240 and 231-234, respectively. Powell's method and Simulated Annealing are described in Press, W. H., Teukolsky, S. A., Betterling, W. T., and Flannery, B. P. (2007), Numerical Recipes: The Art of Scientific Computing New York: Cambridge University Press pages 509-514 and 540-555, respectively. Regardless of which method is used, the maneuver duration is bounded to reasonable values by applying an objective function "ramp" penalty as the new durations computed by the optimization method approach the minimum and maximum duration limits. The process is repeated until the optimization method converges (step 322). The optimization method results are saved as the final maneuver estimate for this run (step 324).

Complex Maneuver Estimation

Figure 15:
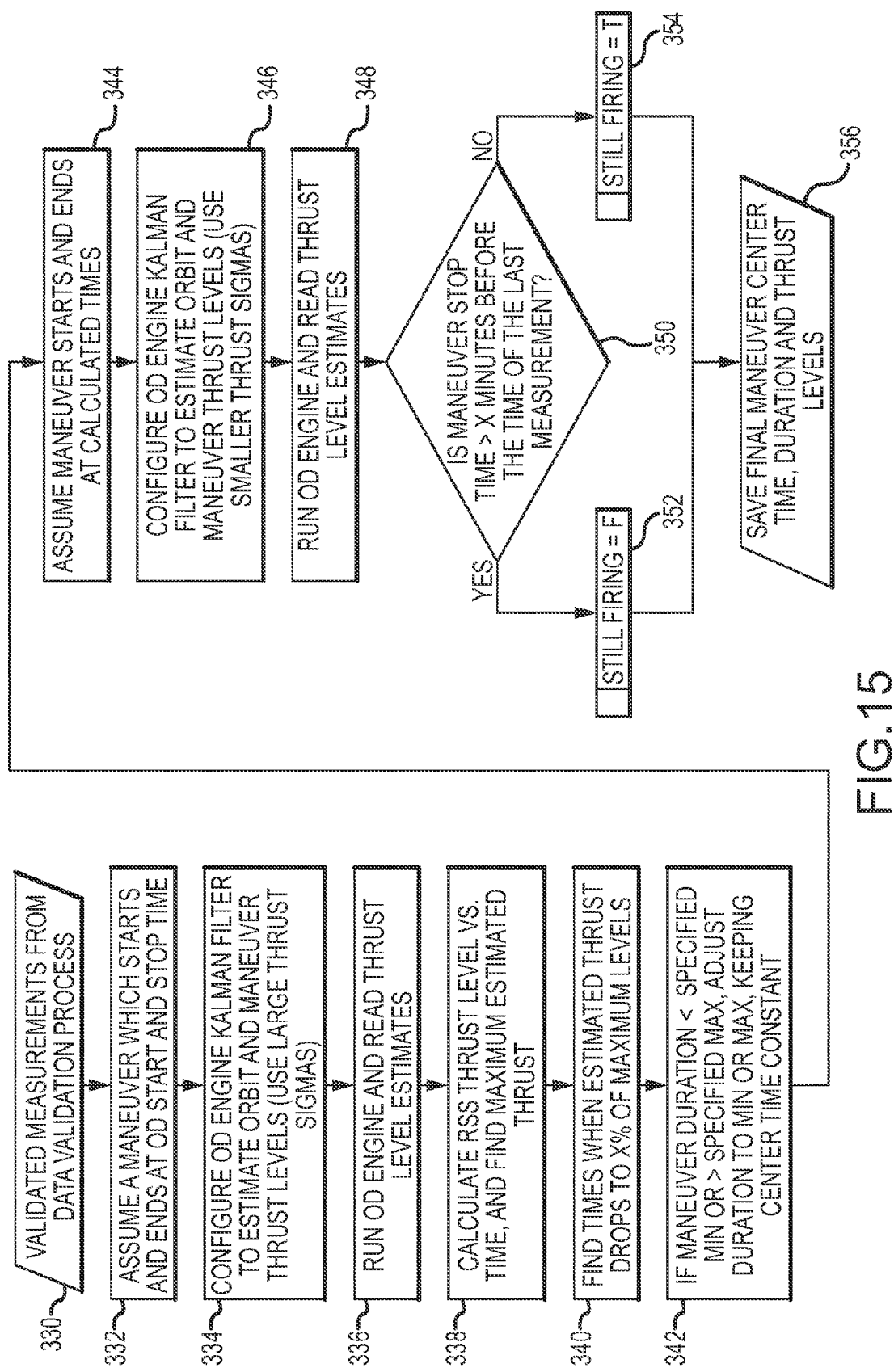
FIG. 15 is a flow diagram of an embodiment of a complex maneuver estimation process.

If the Coarse Maneuver Estimation process cannot find a good solution for the maneuver, it is likely due to one of a few causes: 1) the maneuver direction is in an unusual or non-standard direction which the Coarse Maneuver Estimation process did not try, 2) the satellite "pulsed" their thrusters (fired the thruster(s), shut them down, fire the thruster(s) again, etc.) over a period of time, or 3) there was insufficient or insufficiently accurate measurement data—the data was sufficient to detect the maneuver, but not to characterize it. The Complex Maneuver Estimation process is used as a lower-accuracy fallback when Coarse Maneuver Estimation cannot compute a good maneuver solution An embodiment of Complex Maneuver Estimate process has been developed for Kalman Filter-based OD Engines. This process is illustrated in FIG. 15. The process begins with validated measurement data from the Data Validation process (step 330). First, a maneuver is assumed which spans a wide range of time—up to the entire OD measurement interval (step 332). The EKF is configured to estimate the orbit and thrust levels in all three axes, with large a priori sigmas on the thrust values (step 334). The OD Engine is run, and the solved-for thrust values are read (step 336). The process calculates the overall thrust magnitude vs. time (square root of the sum of the squares of the thrust in each axis) (step 338), and determines the times at which the estimated thrust level crosses X % of the maximum level (step 340)—these times are the estimated maneuver start and stop times. If this calculation results in a maneuver that is longer than a specified maximum duration or shorter than a specified minimum (the same parameters used in the Maneuver Refinement process), then the estimated duration is reduced to the maximum duration or increased to the minimum duration, while keeping the estimated maneuver center time constant (step 342).

Next, the EKF is configured to estimate the orbit and the maneuver thrust levels for the new maneuver start and stop times, using smaller thrust sigmas (steps 344 and 346). The OD Engine is run (step 348) a second time, and the results are read, and if the maneuver stop time is >X minutes before the time of the last measurement being used (step 350), the StillFiring flag is set to False (step 352) otherwise the flag is set to True (step 354). These results are saved as the final maneuver estimate for Complex Maneuver Estimation (step 356). Complex Maneuver Estimation results are not passed to the Maneuver Refinement process, because it was found that the Maneuver Refinement process would always increase the maneuver duration to the maximum value, without improving the maneuver metrics such as the objective function.

If, after processing a number of maneuvers with the Complex Maneuver Estimation process, a pattern is seen, for example if each solution shows the same multi-axis maneuver direction, then this information can be used to add new maneuver direction hypotheses to the Coarse Maneuver Estimation process, eliminating failure cause #1.

In the top-level maneuver process (FIG. 4), a flag is set such that when a maneuver ends up in Complex mode, a set number of attempts are made to re-try Coarse Maneuver Estimation on that satellite, because sometimes when new measurement data is received, it is found that the Coarse Maneuver Estimation process can now be successful (failure cause #3).

While several illustrative embodiments of the invention have been shown and described, numerous variations and alternate embodiments will occur to those skilled in the art. Such variations and alternate embodiments are contemplated, and can be made without departing from the spirit and scope of the invention.

We claim:

1. A method of estimating maneuvers for Earth-orbiting satellites, comprising:
   acquiring measurement data on an Earth-orbiting satellite from one or more tracking systems;
   computing measurement residuals as the difference between measured and predicted data in a temporal sliding window for an Earth-orbiting satellite;
   processing the measurement residuals to identify and validate those residuals that are consistent with the current orbit parameters;
   processing the measurement residuals to identify and validate those residuals that are consistent with an allowable maneuver of the Earth-orbiting satellites and to reject the remaining measurement residuals;
   defining an objective function including a residual fit component to the current orbit and maneuver estimate, an orbit consistency component and a penalty component for validated measurement residuals rejected by an orbit determination (OD) engine to bias a selection of a maneuver estimate to fit all or substantially all of the validated measurement residuals;
   processing the validated measurement residuals to detect an occurrence of a maneuver;
   upon detection of a maneuver, generating a maneuver estimate;
   running the OD engine with the maneuver estimate on the validated measurement residuals to update the orbit parameters, said OD engine removing validated measurement residuals that present as outliers given the current orbit and maneuver estimate;
   evaluating the objective function to determine whether the maneuver estimate satisfies a quality metric;
   updating the maneuver estimate;
   repeating the steps of running the OD engine, evaluating the objective function and updating the maneuver estimate until the maneuver estimate satisfies the quality metric;
   applying the maneuver estimate to update the orbit parameters for the Earth-orbiting satellite; and
   outputting the orbit parameters and maneuver parameters for the Earth-orbiting satellite.

2. The method of claim 1, wherein the OD engine excludes measurement residuals that lie outside N*sigma from the mean of the measurement residuals where N is a non-zero value and sigma is the standard deviation of the measurement residuals.

3. The method of claim 1, wherein the temporal sliding window spans a period of at least 90 minutes.

4. The method of claim 1, wherein measurement data is provided from a plurality of sensors.

5. The method of claim 1, wherein the validated measurement residuals are generated by
   separating the measurement residuals into continuous arcs of at least a minimum length;
   fitting each continuous arc to possible trajectories associated with allowable maneuvers of the Earth-orbiting satellites; and
   retaining measurement residuals associated with continuous arcs whose fit satisfies a metric.

6. The method of claim 5, wherein the continuous arcs are validated by double differencing the residuals to remove linear and quadratic trends, and then removing residuals that have more than a defined amount of noise with respect to the double-differenced residuals.

7. The method of claim 6, wherein the continuous arcs are validated in both the forward and backwards directions and only the residuals that have more than the defined amount of noise in both directions are removed.

8. The method of claim 5, wherein fitting each continuous arc removes trends associated with allowable maneuvers to flatten the measurement residuals, wherein the flattened residuals that are more than a defined amount of noise are removed.

9. The method of claim 1, wherein the validated measurement residuals are processed to detect the occurrence of large and small maneuvers in which a large maneuver represents a greater deviation from the orbit than the small maneuver by:
   processing the measurement residuals to determine whether a large maneuver has occurred; and
   if a large maneuver is not indicated, computing a deviation from the expected orbit to determine whether a small maneuver has occurred.

10. The method of claim 9, wherein measurement residuals are of different types and from multiple sensors, wherein processing to determine the large maneuver comprises, identifying groups of residuals that are trending away from the pre-maneuver orbit, if more than a set percentage of measurement types and sensors have residuals trending away from the pre-maneuver orbit, a large maneuver is detected.

11. The method of claim 9, wherein processing to determine the large maneuver comprises, identifying validated measurement residuals that are more than a defined amount above a mean of the validated residuals.

12. The method of claim 1, wherein generating the maneuver estimate comprises, solving for a maneuver center time and duration, thrust level and direction.

13. The method of claim 1, wherein generating the maneuver estimate comprises, generating a coarse maneuver estimate whose objective function satisfies an initial metric; and refining the coarse maneuver estimate to provide an objective function that satisfies a final metric.

14. The method of claim 13, wherein the coarse maneuver estimate is generated using a pattern matching technique.

15. The method of claim 13, wherein the coarse maneuver estimate is generated using a stochastic estimation technique.

16. The method of claim 13, wherein if a coarse maneuver estimate whose objective function satisfies the initial metric cannot be found, using a complex maneuver estimation technique to provide the maneuver estimate.

17. The method of claim 1, wherein as new measurement data is received, the process is repeated, incorporating the new measurement data, until a defined amount of post-maneuver measurement data has been included and the results satisfy a quality metric.

18. The method of claim 1, wherein the residual fit component is a metric associated with the orbit determination engine.

19. The method of claim 1, wherein the orbit consistency component is a metric associated with the consistency of the pre- and post-maneuver orbits.

20. The method of claim 1, wherein the rejection penalty component is a metric associated with the amount of measurement data rejected by the current run of OD engine.

21. The method of claim 1, wherein the orbit determination engine is a batch weighted least squares process or an Extended Kalman filter.

* * * * *